United States Patent
Kobayashi et al.

(10) Patent No.: US 11,021,007 B1
(45) Date of Patent: Jun. 1, 2021

(54) LAMINATED FILM FOR MOLDED DECORATION

(71) Applicant: NIPPON PAINT AUTOMOTIVE COATINGS CO., LTD., Osaka (JP)

(72) Inventors: Kazuhito Kobayashi, Hirakata (JP); Masahiro Kitamura, Hirakata (JP); Yusuke Nakata, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 259 days.

(21) Appl. No.: 16/089,519

(22) PCT Filed: Mar. 24, 2017

(86) PCT No.: PCT/JP2017/012079
§ 371 (c)(1),
(2) Date: Sep. 28, 2018

(87) PCT Pub. No.: WO2017/170246
PCT Pub. Date: Oct. 5, 2017

(30) Foreign Application Priority Data

Mar. 30, 2016 (JP) .............................. JP2016-069294

(51) Int. Cl.
*B32B 7/02* (2019.01)
*B44C 5/04* (2006.01)
(Continued)

(52) U.S. Cl.
CPC .............. *B44C 5/0453* (2013.01); *B44C 3/04* (2013.01); *C08J 7/042* (2013.01); *C09D 5/002* (2013.01);
(Continued)

(58) Field of Classification Search
CPC ........... B32B 7/02; B32B 7/023; B32B 7/027; C09D 133/00; C09D 133/04;
(Continued)

(56) References Cited

U.S. PATENT DOCUMENTS

2005/0017384 A1    1/2005   Tamai et al.
2006/0171034 A1    8/2006   Shoshi et al.
(Continued)

FOREIGN PATENT DOCUMENTS

JP    2005-305383    11/2005
JP    2006478276    7/2006
(Continued)

OTHER PUBLICATIONS

JP 2014-041244 Machine Translation (Year: 2014).*
(Continued)

*Primary Examiner* — Zachary M Davis
(74) *Attorney, Agent, or Firm* — Wenderoth, Lind & Ponack, L.L.P.

(57) ABSTRACT

The present invention provides a laminated film for molded decoration including a transparent polymer substrate, a hard coat layer having a thickness of 2 to 10 µm, and a protective layer having a thickness of 50 to 200 nm laminated in that order, in which the hard coat layer is a cured layer of a hard coating composition, the protective layer is a cured layer of a coating composition for forming a protective layer, the laminated film for molded decoration has an extension rate within a range of 15 to 80%, and after a scratch test involving 200 reciprocations under a load of 2 N per 4 cm$^2$ of a surface of the laminated film for molded decoration, the laminated film for molded decoration has no scratches and no deterioration in visibility due to change in appearance.

16 Claims, 1 Drawing Sheet

(51) Int. Cl.
  *C08J 7/04* (2020.01)
  *C09D 5/00* (2006.01)
  *C09D 133/14* (2006.01)
  *C09D 135/02* (2006.01)
  *B44C 3/04* (2006.01)

(52) U.S. Cl.
  CPC ......... *C09D 133/14* (2013.01); *C09D 135/02* (2013.01); *C08J 2333/04* (2013.01); *C08J 2369/00* (2013.01); *C08J 2433/10* (2013.01); *C08J 2433/14* (2013.01); *C08J 2435/02* (2013.01)

(58) Field of Classification Search
  CPC .. C09D 133/06; C09D 133/08; C09D 133/10; C09D 133/12; C09D 133/14; C09D 133/16; C09D 175/00; C09D 175/04; C09D 175/06; C09D 175/08; C09D 175/10; C09D 175/12; C09D 175/14; C09D 175/16
  See application file for complete search history.

(56) References Cited

U.S. PATENT DOCUMENTS

| | | | |
|---|---|---|---|
| 2009/0207492 A1 | 8/2009 | Horio et al. | |
| 2010/0260986 A1 | 10/2010 | Ito | |
| 2014/0248478 A1 | 9/2014 | Saito et al. | |
| 2015/0049261 A1 | 2/2015 | Kobayashi et al. | |

FOREIGN PATENT DOCUMENTS

| | | |
|---|---|---|
| JP | 2009-184284 | 8/2009 |
| JP | 2011-126157 | 6/2011 |
| JP | 2011-131406 | 7/2011 |
| JP | 2011-148964 | 8/2011 |
| JP | 2012-48195 | 3/2012 |
| JP | 2012-51247 | 3/2012 |
| JP | 2012-210755 | 11/2012 |
| JP | 2014-41244 | 3/2014 |
| JP | 2015-66731 | 4/2015 |
| JP | 2016-40105 | 3/2016 |

OTHER PUBLICATIONS

International Search Report dated Jun. 27, 2017 in International Application No. PCT/JP2017/012079.

Extended European Search Report dated Oct. 15, 2019 in corresponding European Patent Application No. 17774783.9.

International Preliminary Report on Patentability dated Oct. 11, 2018 in International Application No. PCT/JP2017/012079.

Office Action dated Apr. 15, 2020 in corresponding Chinese Patent Application No. 201780021069.4, with English Translation.

* cited by examiner

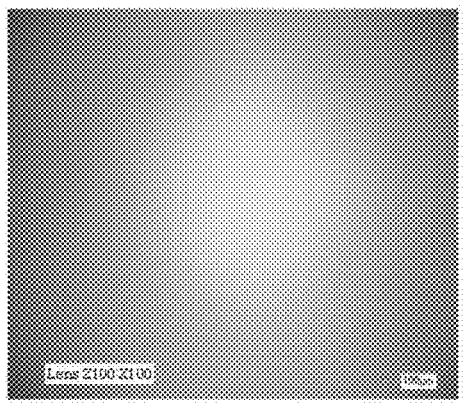
Example 1 ☉
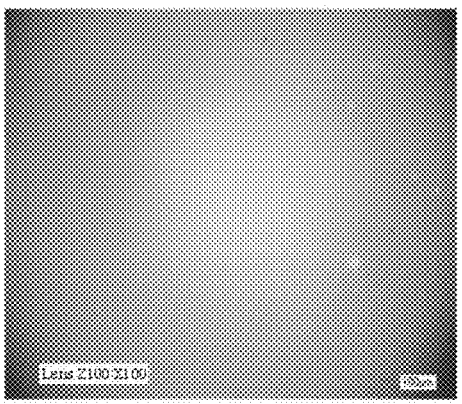
Example 4 ○
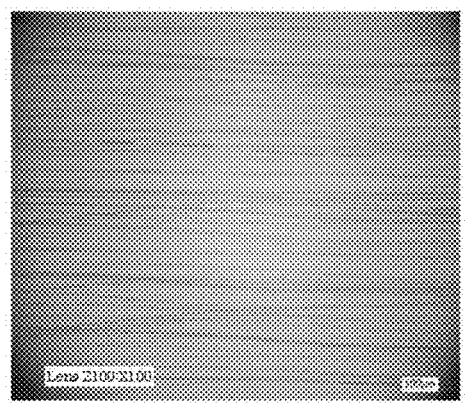
Comparative Example 3 ×
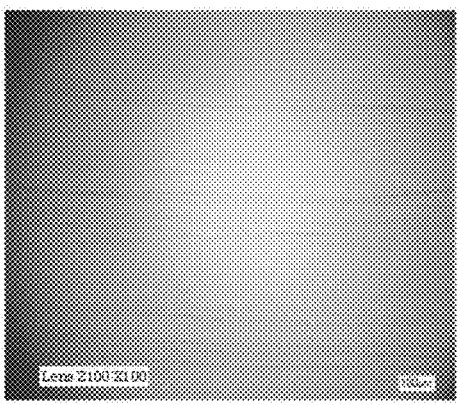
Comparative Example 6 △
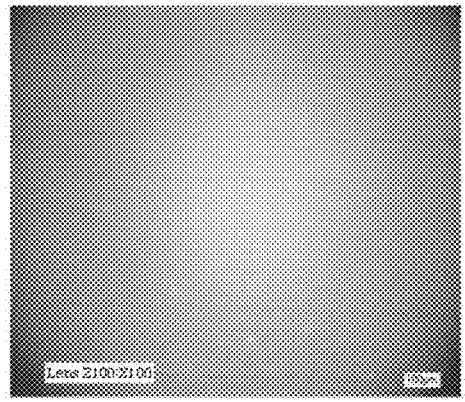
Comparative Example 10 △

LAMINATED FILM FOR MOLDED DECORATION

TECHNICAL FIELD

The present invention relates to a laminated film for molded decoration, a decorated molding produced from the laminated film for molded decoration, and a decoration panel including the decorated molding.

BACKGROUND ART

There exist laminated films for decoration capable of being applied to AVC products such as TV receivers and personal computers, electronic equipment housings such as mobile phones, tablet personal computers and electronic notebooks, housings of general household appliances, and automotive interior materials such as console panels, center clusters and switch bases.

In order to decorate products, laminated films for decoration are usually provided with desired painting and/or printing. Moreover, laminated films for decoration are molded into complicated shapes by, for example, in-mold molding or insert molding according to the shapes of products to which the laminated films are to be applied.

For example, a laminated film for decoration is produced by curing a composition for forming a film and then is molded into a desired shape. The laminated film for decoration formed by such a production method is called a pre-cure type laminated film for decoration.

When the thus-molded laminated film for decoration is used for a console panel as an automotive interior material, a molding product including the laminated film for decoration plays a role to protect a display panel in addition to decoration purpose. In order to protect a display panel, the molding product must have an appropriate hardness and the laminated film for decoration constituting the molding product also must have a sufficient hardness.

As examples of such a laminated film for decoration with an appropriate hardness, a laminated film in which a substrate and a hard coat layer with a prescribed surface hardness are laminated with each other (Patent Literature 1) is disclosed. A hard coat film for molding in which a substrate film, an intermediate layer, and a hard coat layer are laminated in that order (Patent Literature 2) is disclosed. In addition, a hard coat film for molding having a hard coat layer formed by applying a coating liquid to at least one side of a substrate film and then curing the liquid (Patent Literature 3) is disclosed.

Moreover, for example, when protecting a display panel, a laminated film for decoration must be resistant to deteriorate in visibility due to scratches formed on the outermost surface even under long-term use conditions, in other words, must have a long-term visibility-ensuring property. A laminated film with a hard coat layer formed on a surface thereof like those disclosed in the above-cited patent literatures, however, will have many scratches on its surface during long-term use because it is low in scratch resistance. As a result, the scratches will deteriorate the visibility of a display panel to be protected. Likewise, generation of many scratches may lead to deterioration of decorativeness in appearance.

In view of this, there has been disclosed laminated films in which a substrate film, a hard coat layer, and a low refractive layer having an anti-reflection function are disposed in order to eliminate the glare on the surface of the laminated film for decoration and the decrease in transparency (Patent Literatures 4 and 5).

CITATION LIST

Patent Literature

Patent Literature 1: JP-A-2009-184284
Patent Literature 2: JP-A-2011-126157
Patent Literature 3: JP-A-2011-148964
Patent Literature 4: JP-A-2014-041244
Patent Literature 5: JP-A-2012-048195

SUMMARY OF THE INVENTION

An object of the present invention is to provide a laminated film for decoration that has high hardness and scratch resistance, an excellent long-term visibility-ensuring property, and excellent decorativeness, and that is capable of following deformation without generating cracks during molding processing and capable of being easily molded.

[1] The present invention provides a laminated film for molded decoration comprising: a transparent polymer substrate; a hard coat layer having a thickness of 2 to 10 μm; and a protective layer having a thickness of 50 to 200 nm laminated in that order, wherein the hard coat layer is a cured layer of a hard coating composition, the protective layer is a cured layer of a coating composition for forming a protective layer, the laminated film for molded decoration has an extension rate within a range of 15 to 80%, and after a scratch test involving 200 reciprocations under a load of 2 N per 4 cm$^2$ of a surface of the laminated film for molded decoration, the laminated film for molded decoration has no scratches and no deterioration in visibility due to change in appearance. The laminated film solves the above-mentioned problems.

[2] In one embodiment, provided is the laminated film for molded decoration according to [1], wherein (1) the protective layer has an extension rate within a range of 0.01 to 20% when having a thickness of 2 to 4 μm and has a glass transition temperature of 100° C. or more, (2) the hard coat layer has an extension rate within a range of 15 to 80% when having a thickness of 2 to 4 μm and a glass transition temperature of 60 to 105° C., and (3) the transparent polymer substrate has a glass transition temperature of 60 to 160° C., and the laminated film for molded decoration satisfies relationships below:

the extension rate of the protective layer (1)<the extension rate of the hard coat layer (2), and the glass transition temperature of the protective layer (1)>the glass transition temperature of the transparent polymer substrate (3)>the glass transition temperature of the hard coat layer (2).

[3] In one embodiment, provided is the laminated film for molded decoration according to [1] or [2], wherein the protective layer has a refractive index of 1.38 to 1.53.

[4] In one embodiment, provided is the laminated film for molded decoration according to any one of [1] to [3], wherein the protective layer has a water contact angle of 100° or more and the protective layer has an oleic acid contact angle of 70° or more.

[5] In one embodiment, provided is the laminated film for molded decoration according to any one of [1] to [3], wherein the protective layer has a water contact angle of 65 to 80° and the protective layer has an oleic acid contact angle of less than 5°.

[6] In one embodiment, provided is the laminated film for molded decoration according to any one of [1] to [5], wherein the hard coat layer has a refractive index of 1.50 to 1.57.

[7] In one embodiment, provided is the laminated film for molded decoration according to any one of [1] to [6], wherein the hard coat layer is a cured layer of a hard coating composition containing a polyfunctional (meth)acrylate compound and a polyfunctional urethane acrylate.

[8] In one embodiment, provided is the laminated film for molded decoration according to [7], wherein
the hard coat layer is a cured layer of a hard coating composition containing a first component and a second component,
the hard coat layer has, on a side on which the protective layer is located, fine irregularities formed through phase separation between the first component and the second component, and
the hard coat layer has a surface roughness of 0.01 to 2.00 µm on the surface having the fine irregularities.

[9] In one embodiment, provided is the laminated film for molded decoration according to any one of [1] to [7], wherein the first component contains a polyfunctional (meth)acrylate compound and a polyfunctional urethane acrylate, and the second component is an unsaturated double bond-containing acrylic copolymer.

[10] In one embodiment, provided is the laminated film for molded decoration according to any one of [1] to [9], wherein
the coating composition for forming a protective layer is a composition that affords an indentation hardness of 250 to 2000 N/mm$^2$ as measured with a micro hardness meter at an indentation of 0.1 µm when a cured film having a thickness of 5 to 10 µm is formed on a glass plate,
the hard coating composition is a composition that affords an indentation hardness of 100 to 400 N/mm$^2$ as measured with a micro hardness meter at an indentation of 0.1 µm when a hard coat layer having a thickness of 2 to 10 µm is formed on a glass plate, and
the laminated film for molded decoration satisfies a relationship of (the indentation hardness based on the coating composition for forming a protective layer)>(the indentation hardness based on the hard coating composition).

[11] In one embodiment, provided is the laminated film for molded decoration according to any one of [1] to [10], wherein the transparent polymer substrate is a laminate of an acrylic polymer and polycarbonate.

[12] In one embodiment, provided is a decorated molding comprising the laminated film according to any one of [1] to [11].

[13] In one embodiment, provided is a decorated molding comprising the laminated film according to any one of [1] to [11], wherein a decorative layer, the transparent polymer substrate, the hard coat layer, and the protective layer are laminated in that order.

[14] In one embodiment, provided is a decoration panel having the decorated molding according to [12] laminated on a displaying side of a touch panel or a display, wherein
the decorated molding is laminated with a substrate surface of the transparent polymer substrate located on a side opposite the hard coat layer being disposed on the displaying side of the touch panel or the display.

[15] In one embodiment, provided is a decoration panel having the decorated molding according to [13] laminated on a displaying side of a touch panel or a display, wherein
a decorative layer is disposed on a part of a substrate surface of the transparent polymer substrate located on a side opposite the hard coat layer, and
the decorated molding is laminated with a substrate surface of the transparent polymer substrate located on a side opposite the hard coat layer being disposed on the displaying side of the touch panel or the display, wherein,
the substrate surface of the transparent polymer substrate on which the decorative layer is not provided is disposed on the displaying side.

[16] In one embodiment, provided is a method for producing the laminated film for molded decoration according to any one of [1] to [11], the method comprising:
applying a hard coating composition containing a first component and a second component to the transparent polymer substrate;
drying and curing the hard coating composition applied to form a hard coat layer;
forming, through phase separation between the first component and the second component in the drying step, fine irregularities on a surface of the hard coat layer on which the protective layer is to be laminated;
applying a coating composition for forming a protective layer to the surface of the hard coat layer on which the fine irregularities have been formed; and drying and curing the coating composition for forming a protective layer applied to form a protective layer.

[17] In one embodiment, provided is the method for producing the laminated film for molded decoration according to [16], wherein the first component is urethane acrylate and the second component is an acrylic copolymer.

The laminated film for molded decoration of the present invention has high hardness and scratch resistance, an excellent long-term visibility-ensuring property, and excellent decorativeness. Furthermore, the laminated film for molded decoration of the present invention can follow deformation without generating cracks during molding processing and can be easily molded.

BRIEF DESCRIPTION OF THE DRAWINGS

FIG. 1 is a diagram illustrating results of microscopic observation in Examples 1 and 4 and Comparative Examples 3, 6, and 10.

DESCRIPTION OF EMBODIMENTS

First, the process leading to the present invention will be described.

In recent years, in order to solve the above problems and improve the scratch resistance of a laminated film for decoration, an attempt has been made to increase the crosslinking density of a surface layer of a laminated film for decoration having a hard coat layer.

In the case of a pre-cure type laminated film for decoration, however, when the crosslinking density of a surface of the laminated film for decoration increases, the layer with an increased crosslinking density becomes impossible to deform while extending sufficiently during the laminated film for decoration is molded into a desired shape. Therefore, cracks will be formed in the surface of the laminated film for decoration.

As described above, in the case of using a pre-cure type laminated film for decoration, when the crosslinking density of a film surface increases (the scratch resistance is improved), cracks will be formed in the surface of the laminated film for decoration during molding. Therefore, a laminated film for decoration excellent in scratch resistance and moldability is required.

Accordingly, in order to produce a laminated film for decoration having an appropriate hardness and also excellent scratch resistance, an after-cure type film forming composition that is filled into a prescribed mold, followed by molding, and then cured under conditions including a prescribed temperature, and a molding product produced from the composition have been developed. Since an after-cure type laminated film for decoration is cured after being molded into a desired shape, cracks are less prone to be formed in the surface of the laminated film for decoration.

When an after-cure type film forming composition is used, however, it is necessary to perform molding and curing while controlling storage conditions and curing conditions of a molded film before curing. Therefore, unlike a pre-cure type laminated film for decoration, scratches and dents are easily formed during a series of processing works including a coating process, molding and curing by external pressure generated from contact of human fingers or equipment on the processed surface side. This leads to problems such as an increased defective rate of products with poor finished appearance and a reduced yield rate of products with good finished appearance.

On the other hand, when a laminated film for decoration is used, for example, for a console panel as an automotive interior material, it is necessary from the viewpoint of safety to prevent external light from being reflected and irregularly reflected on a surface of the console panel. Further, if a laminated film for decoration also plays a role of protecting a display panel, it is necessary to solve the problem of the glare of light on the surface of the laminated film for decoration and the decrease in transparency (screen looks white).

The laminated films described in Patent Literatures 4 and 5 are poor in mold-ability because cracks are formed in surfaces thereof when being molded. For this reason, the laminated films have serious restrictions on their molded shape and can be applied only to a shape being close to planar, and they are difficult to be applied to objects with a three-dimensional shape such as a center console of an automotive interior material.

The laminated film for molded decoration of the present invention, which solves all such problems, is a laminated film for molded decoration including a transparent polymer substrate, a hard coat layer having a thickness of 2 to 10 μm, and a protective layer having a thickness of 50 to 200 nm are laminated in that order, in which
the hard coat layer is a cured layer of a hard coating composition,
the protective layer is a cured layer of a coating composition for forming a protective layer,
the laminated film for molded decoration has an extension rate within the range of 15 to 80%, and
after a scratch test involving 200 reciprocations under a load of 2 N per 4 cm$^2$ of a surface of the laminated film for molded decoration, the laminated film for molded decoration has no scratches and no deterioration in visibility due to change in appearance.

In the present specification, the phrase "has no deterioration in visibility due to change in appearance" means that there is no deterioration in visibility caused by change in surface layer appearance such as scratches on the surface layer along with long-term use. The technical feature that "has no deterioration in visibility due to change in appearance" can be interpreted as having long-term visibility-ensuring property.

In the present invention, the extension rate of a laminated film for molded decoration represents a limit value at which the laminated film for molded decoration can be stretched without generating cracks with a size of 1 μm or more in the film.

In more detail, in the present invention, the extension rate is a limit value determined as follows, for example:
a test sample cut in a length of 200 mm and a width of 10 mm is extended by 5% under a 100° C. atmosphere at a rate of 300 mm/min using a tensile tester with a distance between chucks of 150 mm. The sample is then observed using a microscope with a magnification of 1000 times or more to check whether cracks with a size larger than a length of 100 μm and a width of 1 μm have been generated. When no cracks have been generated, a new sample is cut out and then generation of cracks is observed according to a similar procedure at 10% extension. This procedure is repeated and when extensibility is checked at every 5% interval, there is determined a limit value at which cracks with the above-mentioned size is observed.

More specifically, calculation can be performed as follows:
the case of stretching from a distance between chucks of 150 mm (initial value) to a distance between chucks of 217.5 mm is defined as 45% stretch:

$$45\% \text{ stretch} = \{(217.5 \text{ mm} - 150 \text{ mm})/150 \text{ mm}\} \times 100,$$

and the case of stretching from a distance between chucks of 150 mm (initial value) to a distance between chucks of 225 mm with no generation of cracks at 45% stretch is defined as 50% stretch, $$50\% \text{ stretch} = \{(225 \text{ mm} - 150 \text{ mm})/150 \text{ mm}\} \times 100.$$

For example, when cracks are generated at 50% stretch, the extension rate is described as 45 to 50%. This description means that cracks can be generated at an extension rate between 45 and 50%.

In the present description, extension rates are described also for a protective layer and a hard coat layer, and the conditions and the like for them are as described in the description.

The extension rate of the laminated film for molded decoration is within the range of 15 to 80%. As understood from the above description, "15 to 80%" described for the extension rate in the present description means that the extension rate is 15% or more and less than 80%.

In one embodiment, the extension rate is within the range of 15 to 70%, for example, 15 to 65%. In one embodiment, the extension rate is within the range of 15 to 60%. Any extension rate may be taken within such a range and the extension rate may be, for example, 20 to 60%, and may be, for example, 40 to 60%, and in one embodiment, may be 50 to 60%.

When the laminated film for molded decoration has an extension rate within such a range, it can have high hardness, an excellent long-term visibility-ensuring property, and also excellent decorativeness. Moreover, a laminated film for molded decoration is obtained which can follow deformation without generating cracks during molding processing and which can be easily molded.

The laminated film for molded decoration of the present invention has an extension rate within the range of 15 to 80%, and after a scratch test involving 200 reciprocations under a load of 2 N per 4 cm$^2$ of a surface of the laminated film for molded decoration, the laminated film for molded decoration has no scratches and deterioration in visibility due to change in appearance.

The term "has no scratches" as used herein means that scratches are not observed when the presence or absence of scratches is checked. For example, as shown in FIG. 1, it means that no generation of scratches is observed when a sample surface after the scratch test is observed visually with use of a microscope with a magnification of 100 times. In more detail, "has no scratches" means a state where no scratches are observed visually and slight scratches or no scratches are observed by a microscope with a magnification of 100 times, and means a state where the laminated film for molded decoration of the present invention has a long-term visibility-ensuring property.

As described above, the laminated film for molded decoration of the present invention having a prescribed extension rate and having no scratches after the scratch test and no deterioration in visibility due to change in appearance has high hardness and scratch resistance, an excellent long-term visibility-ensuring property, and excellent decorativeness. Moreover, the laminated film for molded decoration can follow deformation without generating cracks and can be easily molded even when a complicated shape is required.

In one embodiment, in the laminated film for molded decoration of the present invention, (1) the protective layer has an extension rate within the range of 0.01 to 20% when having a thickness of 2 to 4 μm and has a glass transition temperature of 100° C. or more, (2) the hard coat layer has an extension rate within the range of 15 to 80% when having a thickness of 2 to 4 μm and has a glass transition temperature of 60 to 105° C., and (3) the transparent polymer substrate has a glass transition temperature of 60 to 160° C., and the laminated film for molded decoration satisfies the following relationship:

the extension rate of the protective layer (1)<the extension rate of the hard coat layer (2), and the glass transition temperature of the protective layer (1)>the glass transition temperature of the transparent polymer substrate (3)>the glass transition temperature of the hard coat layer (2).

For example, since the laminated film for molded decoration of the present invention has a protective layer having a high crosslinking density, a hard coat layer having a prescribed extension rate, and a transparent polymer substrate, displacement on molding or the like may occur in stages from the lower layer (the transparent polymer substrate). Therefore, the laminated film for molded decoration of the present invention having the protective layer, the hard coat layer, and the transparent polymer substrate satisfying a prescribed relationship is not totally broken even under a situation in which extension equal to or greater than the limit possessed by the protective layer is generated. In addition, the laminated film for molded decoration has sufficient mold-ability and scratch resistance.

In one embodiment, since the protective layer and the hard coat layer can be stretched without generation of cracks even after being cured with ultraviolet rays, it is possible to develop the layers as a laminated film for molded decoration having been cured to a molding processing step and eliminate deficiencies to scratches or the like which may be generated during the molding processing step.

The laminated film for molded decoration of the present invention can eliminate low mold-ability and weak scratch resistance inherent to the pre-cure type (the type in which a protective layer, a hard coat layer, and the like are cured in advance, and then a molding processing step is carried out), which are heretofore difficult to be eliminated. Poor handling inherent to the after-cure type (the type in which a protective layer, a hard coat layer, and the like are subjected to a molding processing step and molded into a three-dimensional shape with the layers remaining uncured, and then the protective layer, the hard coat layer, and the like are cured) can be eliminated.

In the present invention, the pre-cure type composition denotes a composition that is molded into a desired shape after curing a composition for forming a protective layer and a composition for forming a hard coat layer and subsequently forming a film from the compositions.

[Hard Coat Layer]

The hard coat layer (also referred to as HC layer) is a cured layer of a hard coating composition and has a thickness of 2 to 10 μm, preferably 2 to 8 μm, for example, 2 to 4 μm.

The hard coat layer preferably has an extension rate within the range of 15 to 80%, more preferably within the range of 15 to 65%, when having a thickness of 2 to 4 μm.

In the description of the extension rate, as described above, measurement is performed using a sample whose hard coat layer has a thickness within a specific range. However, the hard coat layer has a favorable extension rate as long as the thickness thereof is within the range of the present invention.

The extension rate of the hard coat layer can be measured by the following procedure. A hard coat layer having a thickness within the range of 2 to 4 μm, for example, is provided on a PET film having a thickness of 100 μm to prepare a test piece. When the obtained test piece having the hard coat layer has been extended, the extension rate at which no cracks have been generated in the hard coat layer but discoloration has generated in the hard coat layer is defined as the lower limit of the extension rate. In addition, subsequently, the hard coat layer is further extended, the extension rate at which cracks are generated in the hard coat layer is defined as the upper limit of the extension rate. Based on the obtained extension rates, the range defined by the lower limit and the upper limit is denoted as an extension rate.

More specifically, in the present invention, the extension rate denotes, for example, a range of the extension rate (lower limit) and the extension rate (upper limit) defined above in the case of extending a test sample of 200 mm in length×10 mm in width×0.1 mm in thickness under a 100° C. atmosphere at a rate of 300 mm/min by using a tensile tester having a distance between chucks of 150 mm.

The technical feature that the extension rate of the hard coat layer is within the above range affords an advantage that an increased degree of freedom in selection is obtained for the shape of the substrate to which the resulting laminated film for decoration can be applied. Further, the technical feature that the hard coat layer has an excellent extension rate within such a range affords an advantage that the hard coat layer can secure the strain caused by stress generated during molding to the protective layer which will be described in detail below and the extension rate as the laminated film for molded decoration is increased. In addition, since the hard coat layer can relax the strain caused by stress generated during molding, the change in thickness of the protective layer can be suppressed and the change in hue of the laminated film for molded decoration can be suppressed. Further, for example, the laminated film for molded decoration of the present invention has technical property that it is less prone to break against an external impact than conventional laminated films for molded decoration.

Moreover, the hard coat layer preferably has a glass transition temperature of 60 to 105° C., and more preferably has a glass transition temperature of 65 to 102° C.

When the hard coat layer has a glass transition temperature within such a range, for example, good mold-ability and transparency can be provided without generating cracks at the time of molding. The technical feature that the hard coat layer has a glass transition temperature within such a range affords an advantage that the hard coat layer can relax the strain caused by stress generated during molding to the protective layer described in detail below and the molding process-ability as a laminated film for molded decoration is improved.

The technical feature that the hard coat layer of the present invention has an extension rate and a glass transition temperature within such ranges affords an advantage that the extension rate as a laminated film for molded decoration is increased and a substrate to which a resulting laminated film for molded decoration is applied has an increased degree of freedom in shape selection.

In one embodiment, the hard coat layer has a refractive index of 1.50 to 1.57, more preferably 1.50 to 1.54. When the refractive index of the hard coat layer is within such a range, further performance such as anti-reflective performance can be imparted to a resulting laminated film for molded decoration.

In one embodiment, the hard coat layer has a surface roughness of 0.01 to 2.00 μm. The surface roughness is represented by an arithmetical mean height (Ra) and is calculated by a conventional calculation method in accordance with JIS B 0601 (2001). When the hard coat layer has a surface roughness within such a range, a sufficient anti-blocking property can be developed. Moreover, when the hard coat layer has a surface roughness within such a range, it is possible to impart optical characteristics such as a desired matting property and an anti-glare property to a resulting laminated film for molded decoration.

Meanwhile, for example, if the surface roughness exceeds 2.00 μm, the haze of the hard coat layer may increase, so that the visibility may deteriorate.

In one embodiment, the hard coat layer is a cured layer of a hard coating composition containing a first component and a second component.

The hard coat layer has, on its side on which the protective layer may be located, fine irregularities formed through phase separation between the first component and the second component. In addition, the hard coat layer has a surface roughness of 0.01 to 2.00 μm on its surface having the fine irregularities.

In such an embodiment, the types of the first component and the second component are not particularly limited as long as the first component and the second component generate phase separation and the hard coat layer formed from these components can have the features of the present invention.

The phase separation generated by the first component and the second component is preferably phase separation that can form fine irregularities having a surface roughness of 0.01 to 2.00 μm on a surface of the hard coat layer. When phase separation is generated at a surface roughness within such a range, no problem occurs with appearance and a hard coat layer having excellent mechanical strength is formed. An example of the combination of the first component and the second component that generate the phase separation is an embodiment where an SP value of the first component ($SP_1$) and an SP value of the second component ($SP_2$) satisfy the following conditions:

$$SP_2 < SP_1$$

$$SP_1 - SP_2 \geq 2.$$

By applying a hard coating composition containing a first component and a second component satisfying the above conditions to a substrate and drying and curing the composition, the first component and the second component generate phase separation based on the difference in the SP value of the first component and that of the second component, and a coating film having random irregularities on its surface can be formed.

In one embodiment, the hard coat layer is a cured layer of a hard coating composition containing a filler, and the hard coat layer has a surface roughness of 0.01 to 2.00 μm on its surface having fine irregularities. The filler to be used may be one known in the art.

[Protective Layer]

The protective layer is a cured layer of a coating composition for forming a protective layer and has a thickness of 50 to 300 nm, for example, a thickness of 50 to 200 nm. In one embodiment, the protective layer has a thickness of 50 to 180 nm, for example, 50 to 150 nm.

Preferably, the protective layer has an extension rate within the range of 0.01 to 20%, for example, 1 to 20%, when the thickness of the layer is 2 to 4 μm.

The extension rate of the protective layer can be measured by the following procedure. A test piece is prepared by forming a protective layer having a thickness within the range of 2 to 4 μm for measurement of an extension rate on a PET film having a thickness of 100 μm. When the test piece having the protective layer has been extended, the extension rate at which no cracks have been generated in the protective layer but discoloration has generated in the protective layer is defined as the lower limit of the extension rate. In addition, subsequently, the protective layer is further extended, the extension rate at which cracks are generated in the protective layer is defined as the upper limit of the extension rate. Based on such a test, the range defined by the lower limit and the upper limit is denoted as an extension rate.

More specifically, in the present invention, the extension rate denotes, for example, a range of the extension rate (lower limit) and the extension rate (upper limit) defined above in the case of extending a test sample of 200 mm in length×10 mm in width×0.1 mm in thickness under a 100° C. atmosphere at a rate of 300 mm/min by using a tensile tester having a distance between chucks of 150 mm.

In the measurement of the extension rate of the protective layer, a protective layer having a thickness within the range of 2 to 4 μm is used as described above. This is because the difference in the extension rate of the hard coat layer is made clear by matching with the condition for the measurement of the extension rate of the hard coat layer.

Moreover, the protective layer preferably has a glass transition temperature of 100° C. or higher, for example, a glass transition temperature of 106 to 350° C., and in one embodiment, the protective layer has a glass transition temperature of 110 to 350° C.

The technical feature that the combination that the protective layer has a glass transition temperature within such a range and the hard coat layer has a glass transition temperature within the aforementioned range affords an advantage that the hard coat layer can relax the strain caused by stress generated during molding to the protective layer described in detail below and the molding processability as a laminated film for molded decoration is improved. Moreover, the technical feature also affords an advantage that even when a laminated film for molded decoration is under long-term use after being processed and molded, deterioration in visibility due to scratches on its surface or the like is less prone to occur, in other words, a long-term visibility-ensuring property is exerted.

When the protective layer of the present invention has an extension rate and a glass transition temperature within such ranges, good scratch resistance is exerted. In addition, there is an advantage that the extension rate as a laminated film for molded decoration is increased and a substrate to which a resulting laminated film for molded decoration is applied has an increased degree of freedom in shape selection.

In one embodiment, the protective layer has a refractive index of preferably from 1.38 to 1.50. When the protective layer of the present invention having a thickness of 50 to 300 nm, for example, 50 to 200 nm has a refractive index within the above range as described above, it can generate optical interference desirable as a laminated film for molded decoration. For example, the glare due to the anti-reflective effect can be reduced, and the visibility of the laminated film for molded decoration (for example, transparency and reduction in whitening) can be improved.

When the thickness and the refractive index are made within such ranges, decolorability can be performed in any wavelength range and color tone can be controlled, and therefore a laminated film for molded decoration having an excellent design property can be provided.

In one embodiment, the protective layer has a water contact angle of 100° or more, and the protective layer has an oleic acid contact angle of 70° or more. When having the water contact angle and the oleic acid contact angle within such ranges, the protective layer exhibits hydrophobicity and further can have the technical property of repelling fats and oils such as fingerprints, so that it can maintain good appearance.

In another embodiment, the protective layer has a water contact angle of 65 to 80° and the protective layer has an oleic acid contact angle of less than 5°. When having the water contact angle and the oleic acid contact angle within such ranges, the protective layer is excellent in hydrophilicity and lipophilicity and is good in water resistance and performance to prevent visibility deterioration due to fingerprints (fingerprint resistance), and thus, it is effective for preventing fouling. Even when the protective layer has been fouled, it exhibits excellent fouling removability.

When having the configuration according to the present invention, the protective layer can have a high crosslinking density and can have high scratch resistance. As a result, it is possible to obtain a laminated film for molded decoration having a high crosslinking density in its outermost layer and being excellent in moldability, which are heretofore difficult to be obtained.

[Transparent Polymer Substrate]

The transparent polymer substrate preferably has a glass transition temperature of 60 to 160° C. The transparent polymer substrate may be composed of a plurality of transparent polymer films; for example, when the transparent polymer substrate is formed from two different transparent polymer films, the transparent polymer substrate can have a plurality of glass transition temperatures within the above-mentioned range.

The coating composition for forming a protective layer is a composition that affords an indentation hardness of 250 to 2000 N/mm$^2$ as measured with a micro hardness meter at an indentation of 0.1 μm when a cured film having a thickness of 5 to 10 μm is formed on a glass plate.

The hard coating composition for forming a hard coat layer is a composition that affords an indentation hardness of 100 to 400 N/mm$^2$ as measured with a micro hardness meter at an indentation of 0.1 μm when a hard coat layer having a thickness of 2 to 10 μm is formed on a glass plate. In addition, the laminated film for molded decoration satisfies a relationship of (the indentation hardness based on the coating composition for forming a protective layer)>(the indentation hardness based on the hard coating composition).

Here, the "indentation hardness based on the coating composition for forming a protective layer" means an indentation hardness of the coating composition for forming a protective layer measured as described above, and the "indentation hardness based on the hard coating composition" means an indentation hardness of the hard coating composition measured as described above.

The indentation hardness is determined as follows: a resulting cured film or the like is measured for a stress value at an indentation of 0.1 μm, for example, with a micro hardness tester H100CS manufactured by Fischer, and then an indentation hardness of the cured film or the like is measured. The technical feature that the indentation hardness based on the coating composition for forming a protective layer and the indentation hardness of the hard coating composition have such a relationship affords an advantage that good scratch resistance and a long-term visibility-ensuring property can be obtained.

In the following, described are components that can form the hard coat layer, the protective layer and the transparent polymer substrate of the present invention, but the present invention is not limited to these components.

[Hard Coating Composition]

In the present invention, the hard coat layer is a cured layer of a hard coating composition. The cured layer of the hard coating composition is a layer formed by, for example, applying the hard coating composition to a polymer substrate, and then drying and curing the hard coating composition. The application, drying and curing of the hard coating composition can be carried out by methods known in the art.

While the hard coating composition and the coating composition for forming a protective layer will be described below, they should not be limited to the materials below as long as they have the features of the present invention.

The hard coat layer is formed from, for example, a curable resin such as a thermosetting resin or a radiation-curable resin as a main constituent. In the present invention, from the viewpoint that excellent hardness can be obtained and smoothness excellent as a hard coat layer can be imparted, the hard coating composition preferably contains a radiation-curable resin, and in one embodiment, it contains especially an UV-curable resin. The hard coat layer in the present invention preferably contains a radiation-curable resin described below as a main constituent. Here, the phrase "as a main constituent" means that the content is 50% by mass or more, preferably 80% by mass or more based on the mass of the hard coat layer.

The radiation-curable resin is a monomer, oligomer, or polymer that can be crosslinked and cured by radiation. From the viewpoint that the crosslinking density after curing can be made high, the effect of improving the surface hardness can be enhanced and the effect of improving transparency can be enhanced, polyfunctional (meth)acrylate compounds such as a polyfunctional (meth)acrylate monomer, a polyfunctional (meth)acrylate oligomer and a polyfunctional (meth)acrylate polymer can be contained as the radiation-curable resin in the present invention. In the present description, "(meth)acrylate" means acrylate and/or methacrylate. In the present description, the polyfunctional (meth)acrylate compound refers to a compound having no urethane structure and shall not include the urethane acrylate described below. The radiation-curable resin may contain a monofunctional (meth)acrylate compound in addition to the polyfunctional (meth)acrylate compound.

The radiation-curable resin, which may be contained in the hard coating composition, may contain a urethane acrylate, for example. In one embodiment, the hard coating composition contains a polyfunctional (meth)acrylate compound and a urethane acrylate.

As the urethane acrylate, a urethane acrylate monomer, oligomer, polymer, or a combination of at least two or more species thereof can be used. Examples thereof may include urethane acrylate, urethane methacrylate, aliphatic urethane acrylate, aliphatic urethane methacrylate, aromatic urethane acrylate, and aromatic urethane methacrylate. Among them, a polyfunctional urethane acrylate oligomer having a molecular weight of about 1,000 to 10,000 can be preferably used.

The hard coating composition in the present invention may contain, for example, a polyfunctional urethane acrylate having two or more acrylate groups and an ester backbone. Due to inclusion of this polyfunctional urethane acrylate, the resulting hard coat layer can exert sufficient adhesion to the transparent polymer substrate. Further, it is possible to prevent interference fringes by setting the refractive index of the hard coat layer to the prescribed range. The number of the acrylate groups is 2 or more, preferably 2 to 4. In the case of a monofunctional urethane acrylate, the reactivity may be lowered and the adhesion and the hardness may be reduced depending on the molecular weight thereof. When the number of functional groups is too large, adhesion may be reduced due to cure shrinkage.

The polyfunctional (meth)acrylate (compound) is obtained, for example, by reacting a polycarbonate diol (a) (hereinafter sometimes referred to as component (a)), a (meth)acrylate compound (b) having two hydroxyl groups and two ethylenically unsaturated groups in the molecule thereof (hereinafter sometimes referred to as component (b)) and a polyisocyanate (c) (hereinafter sometimes referred to as component (c)).

The polycarbonate diol (a) includes a diol having a linear or branched chain having 2 to 10 carbon atoms and represented by the formula HO—(R—O—C(=O)—O)—R'OH, wherein R and R' are the same or different linear or branched alkylene groups having 2 to 10 carbon atoms, where the number of carbon atoms is the total number of R and R'. Specific examples of R or R' in the above formula include ethylene group, propylene group, butylene group, pentylene group, hexylene group, heptylene group, octylene group, cyclohexylene group, neopentylene group, nonylene group, and 2-methyl-1,8-octylene group, and combinations of two or more of these may be employed. Of these, polycarbonate diols synthesized from 1,5-pentanediol and/or 1,6-hexanediol are preferred. As the component (a), one compound may be used singly, or two or more compounds may be used in combination. Such polyfunctional acrylates may be used singly, or two or more species thereof may be used in combination.

Specific examples of the (meth)acrylate compound (b) having two hydroxyl groups and two ethylenically unsaturated groups in the molecule thereof include (meth)acrylic acid adducts of propylene glycol diglycidyl ether, (meth)acrylic acid adducts of 1,6-hexanediol glycidyl ether, (meth)acrylic acid adducts of ethylene glycol diglycidyl ether, (meth)acrylic acid adducts of 1,4-butanediol diglycidyl ether, (meth)acrylic acid adducts of 1,5-pentanediol diglycidyl ether, (meth)acrylic acid adducts of 1,7-heptanediol diglycidyl ether, and (meth)acrylic acid adducts of 1,8-octanediol diglycidyl ether. Other examples include (meth)acrylic acid adducts of neopentyl glycol diglycidyl ether, (meth)acrylic acid adducts of bisphenol A diglycidyl ether, and (meth)acrylic acid adducts of hydrogenated bisphenol A diglycidyl ether. Of these, acrylic acid adducts of propylene glycol diglycidyl ether and acrylic acid adducts of 1,6-hexanediol diglycidyl ether are preferred.

The polyisocyanate (c) is not particularly limited, but diisocyanate compounds such as aliphatic diisocyanate compounds, alicyclic diisocyanate compounds, and aromatic diisocyanate compounds can be preferably used. Specific examples thereof include tolylene diisocyanate, 4,4'-diphenylmethane diisocyanate, xylylene diisocyanate, xylene diisocyanate, hexamethylene diisocyanate, lysine diisocyanate, 4,4'-methylenebis(cyclohexylisocyanate), methylcyclohexane-2,4 (or 2,6)-diisocyanate, 1,3-(isocyanatemethyl)cyclohexane, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene-polyphenylene diisocyanate, triphenylmethane triisocyanate, naphthalene diisocyanate, tolylene diisocyanate polymer, polymer of diphenylmethane diisocyanate, polymer of hexamethylene diisocyanate, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanatobenzyl, 3,3'-dimethyl-4,4'-diisocyanatodiphenylmethane, 2,6-dimethyl-4,4'-diisocyanatediphenyl, 3,3'-dimethoxy-4,4'-diisocyanatodiphenyl, 1,4-anthracene diisocyanate, phenylene diisocyanate, 2,4,6-tolylene triisocyanate, 2,4,4'-triisocyanatodiphenyl ether, 1,4-tetramethylene diisocyanate, 1,6-hexamethylene diisocyanate, 1,10-decamethylene diisocyanate, 1,3-cyclohexylene diisocyanate, and 4,4'-methylene-bis(cyclohexylisocyanate).

The polyfunctional urethane acrylate can be produced, for example, by feeding the above-mentioned components (a) to (c) to an organic solvent (e.g., methyl ethyl ketone) and reacting them at elevated temperature, if necessary. The completion of the reaction is confirmed by the technical feature that the presence of isocyanate groups has no longer been observed by infrared absorption spectrum.

The polyfunctional urethane acrylate is preferably one having a weight-average molecular weight of 20,000 to 60,000, and more preferably one having a weight-average molecular weight of 30,000 to 50,000. Regarding the weight-average molecular weight of the polyfunctional urethane acrylate, when the molecular weight is excessively large, the viscosity may be increased, so that the smoothness may be impaired and interference fringes may be deteriorated. On the other hand, when the molecular weight is excessively small, the viscosity may be decreased, so that the smoothness of a coated surface may not be maintained and interference fringes may be deteriorated.

From the viewpoint of adhesion, the polyfunctional urethane acrylate preferably has a hydroxyl value of 0 to 20 mg KOH/g, and more preferably has a hydroxyl value of 0 to 5 mg KOH/g. By controlling the hydroxyl value to be low, an effect of maintaining good adhesion after a wet heat test can be obtained. Commercially available polyfunctional urethane acrylates may be used.

In the present invention, the radiation-curable resin contained in the hard coating composition preferably contains a polyfunctional (meth)acrylate compound and a polyfunctional urethane acrylate. In this case, the polyfunctional urethane acrylate is contained preferably in an amount of 30 to 90 parts by mass, more preferably 50 to 85 parts by mass, per 100 parts by mass of the resin components contained in the hard coating composition. When the amount of the polyfunctional urethane acrylate is less than 30 parts by mass, the adhesion strength may decrease, and when the amount of the polyfunctional urethane acrylate exceeds 90 parts, the hardness of the hard coat layer may be impaired.

While the method for synthesizing the polyfunctional urethane (meth)acrylate is not particularly limited, the polyfunctional urethane (meth)acrylate can be obtained, for example, by a urethanization reaction of a polyisocyanate compound and a hydroxyl group-containing (meth)acrylate. This reaction is preferable in that it is suitable for obtaining a polyfunctional urethane (meth)acrylate having three or more acrylic groups in one molecule.

Moreover, in order to adjust the molecular weight of the polyfunctional urethane (meth)acrylate and the flexibility of the molecule, a product prepared as follows can be utilized as the component (A): a known, general-purpose polyol is reacted with a known, general-purpose polyisocyanate to prepare a chain-extended urethane prepolymer having a terminal isocyanate group before a polyisocyanate is reacted with a hydroxyl group-containing (meth)acrylate, and then the chain-extended urethane prepolymer is reacted with a hydroxyl group-containing (meth)acrylate to prepare the product. The polyol is not particularly limited, and examples thereof include ethylene oxide/propylene oxide adducts such as ethylene glycol, diethylene glycol, polyethylene glycol, propylene glycol, dipropylene glycol, polypropylene glycol, neopentyl glycol, 1,4-butanediol, 1,6-hexanediol, and 3-methyl-1,5-pentanediol, polyester polyols, and oxyethylene/oxypropylene copolymers.

The hard coating composition may contain, for example, a hydroxyl group-containing (meth)acrylate. Examples of the hydroxyl group-containing (meth)acrylate include 2-hydroxyethyl acrylate and methacrylate, 2-hydroxypropyl acrylate and methacrylate, ethylene glycol mono(meth)acrylate, propylene glycol mono(meth)acrylate, 2-hydroxy-3-methoxypropyl acrylate and methacrylate, pentaerythritol triacrylate and methacrylate, N-methylol acrylamide and methacrylamide, and N-hydroxyacrylamide and methacrylamide. Their lactone adducts [for example, PCL-FA and PCL-FM Series produced by Daicel Corporation] can also be used.

Examples of products commercially available as the hydroxyl group-containing (meth)acrylate include DPHA (produced by Daicel-Cytec Co., Ltd.), PETRA (pentaerythritol triacrylate; produced by Daicel-Cytec Co., Ltd.), PETIA (produced by Daicel-Cytec Co., Ltd.), Aronix M-403 (dipentaerythritol penta- and hexa-acrylate; produced by TOAGOSEI CO., LTD.), Aronix M-402 (dipentaerythritol penta- and hexa-acrylate; produced by TOAGOSEI CO., LTD.), Aronix M-400 (dipentaerythritol penta- and hexa-acrylate; produced by TOAGOSEI CO., LTD.), SR-399 (dipentaerythritol hydroxypentaacrylate; produced by Sar-tomer), KAYARAD DPHA (produced by Nippon Kayaku Co., Ltd.), and KAYARAD DPHA-2C (produced by Nippon Kayaku Co., Ltd.). The commercial products described above each include a compound containing a hydroxyl group partly in the individual products.

Specific examples of product names of commercially available products of the polyfunctional urethane (meth)acrylate having three or more (meth)acryl groups in one molecule include bifunctional urethane (meth)acrylates ("UX-2201" and "UX-8101" produced by Nippon Kayaku Co., Ltd., "UF-8001", "UF-8003", "UX-6101", "UX-8101" produced by Kyoeisha Chemical Co., Ltd., "Ebecryl 244", "Ebecryl 284", "Ebecryl 2002", "Ebecryl 4835", "Ebecryl 4883", "Ebecryl 8807", "Ebecryl 6700", produced by Daicel-Cytec Co., Ltd.); trifunctional urethane (meth)acrylates ("Ebecryl 254", "Ebecryl 264", "Ebecryl 265", produced by Daicel-Cytec Co., Ltd.); tetrafunctional urethane (meth)acrylates ("Ebecryl8210", produced by Daicel-Cytec Co., Ltd.); hexafunctional urethane (meth)acrylates ("Ebecryl 1290k", "Ebecryl 5129", "Ebecryl 220", "KRM8200", "Ebecryl 1290N", produced by Daicel-Cytec Co., Ltd.); nonafunctional urethane (meth)acrylates ("KRM 7804" produced by Daicel-Cytec Co., Ltd.); decafunctional urethane (meth)acrylates ("KRM 8452", "KRM 8509", produced by Daicel-Cytec Co., Ltd.); and pentadecafunctional urethane (meth)acrylates ("KRM 8655" produced by Daicel-Cytec Co., Ltd.).

For example, commercially available products of a polyfunctional (meth)acrylate compound having at least two (meth)acryloyl groups in its molecule, such as Aronix M-400, M-450, M-305, M-309, M-310, M-315, M-320, TO-1200, TO-1231, TO-595, TO-756 (all produced by TOAGOSEI CO., LTD.); KAYARD D-310, D-330, DPHA, DPHA-2C (all produced by Nippon Kayaku Co., Ltd.); and NIKALAC MX-302 (produced by Sanwa Chemical Co., Ltd.) may be used.

Use of a radiation-curable resin containing the above-mentioned polyfunctional (meth)acrylate compound, polyfunctional urethane acrylate, or the like affords an advantage that it is possible to obtain a laminated film for molded decoration that is excellent in light resistance and that has no photodegradation or the like due to long-term use.

In a specific example in which the hard coat layer has a surface roughness of 0.01 to 2.00 μm in the other embodiment, the hard coat layer is a cured layer of a hard coating composition containing a first component and a second component, the hard coat layer has, on its side on which the protective layer is located, fine irregularities formed through phase separation between the first component and the second component, and the hard coat layer has a surface roughness of 0.01 to 2.00 μm on its surface having the fine irregularities. In this embodiment, the first component and the second component generate phase separation.

An example of the combination of the first component and the second component that generate the phase separation is an embodiment where an SP value of the first component ($SP_1$) and an SP value of the second component ($SP_2$) satisfy the following conditions:

$$SP_2 < SP_1$$

$$SP_1 - SP_2 \geq 2.$$

When a hard coating composition containing the first component and the second component satisfying the above conditions is applied to a substrate, the first component and the second component generate phase separation based on the difference in SP value of the first component and the second component, and a coating film having random irregularities on its surface can be formed.

In this embodiment, it is preferable to use the radiation-curable resin described above, for example in one embodiment, at least one species selected from among polyfunctional (meth)acrylate compounds and urethane acrylate, as the first component. It is preferable to use an unsaturated double bond-containing acrylic copolymer as the second component.

As the above-mentioned first component, a monomer or oligomer having at least one unsaturated double bond group can be preferably used. Specific examples of the first component include a (meth)acrylate monomer, a (meth)acrylate oligomer, a urethane (meth)acrylate monomer, and a urethane (meth)acrylate oligomer each having at least one unsaturated double bond group, and modified monomers and oligomers thereof.

Examples of the unsaturated double bond-containing acrylic copolymer, which is the second component, include a resin produced by copolymerizing a (meth)acrylic monomer and another monomer having an ethylenically unsaturated double bond; a resin produced by reacting a (meth)acrylic monomer with another monomer having an ethylenically unsaturated double bond and an epoxy group; and a polymer produced by adding a component such as acrylic acid or glycidyl acrylate having an unsaturated double bond and another functional group to a resin produced by reacting a (meth)acrylic monomer with another monomer having an ethylenically unsaturated double bond and an isocyanate group. Such unsaturated double bond-containing acrylic copolymers may be used singly, or two or more species thereof may be used in combination. The unsaturated double bond-containing acrylic copolymer preferably has a weight-average molecular weight of 2,000 to 100,000, and more preferably 5,000 to 50,000.

The compounding ratio of the first component to the second component is preferably (the first component)/(the second component)=95/5 to 25/75, more preferably 90/10 to 30/70. The adjustment of the compounding ratio to such a range makes it possible to obtain a hard coat layer having a desired extension rate and glass transition temperature. The phase separation of the first component and the second component makes it possible to obtain a hard coat layer having fine irregularities on its surface and a surface roughness of 0.01 to 2.00 μm.

(Photopolymerization Initiator)

The hard coating composition according to the present invention preferably contains a photopolymerization initiator. The existence of the photopolymerization initiator causes resin components to be well polymerized by irradiation with active energy rays such as ultraviolet rays. Examples of the photopolymerization initiator include alkylphenone-based photopolymerization initiators, acylphosphine oxide-based photopolymerization initiators, titanocene-based photopolymerization initiators, and oxime ester-based polymerization initiators. Examples of the alkylphenone-based photopolymerization initiators include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)bu-tanone-1,2-(dimethylamino)-2-[(4-methylphenyl)methyl]-1-[4-(4-morpholinyl)phenyl]-1-butanone. Examples of the acylphosphine oxide-based photopolymerization initiators include 2,4,6-trimethylbenzoyl-diphenyl-phosphine oxide and bis(2,4,6-trimethylbenzoyl)-phenylphosphine oxide. Examples of the titanocene-based photopolymerization initiators include bis(η5-2,4-cyclopentadien-1-yl)-bis(2,6-difluoro-3-(1H-pyrrol-1-yl)-phenyl)titanium. Examples of the oxime ester-based polymerization initiator include 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), oxyphenylacetic acid, 2-[2-oxo-2-phenylacetoxyethoxy]ethyl ester, and 2-(2-hydroxyethoxy)ethyl ester. Such photopolymerization initiators may be used singly, or two or more species thereof may be used in combination.

Among the above-mentioned photopolymerization initiators, 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1 and 2,2-dimethoxy-1,2-diphenylethan-1-one are preferably used.

The amount of the photopolymerization initiator is preferably 0.01 to 20 parts by mass, more preferably 1 to 10 parts by mass based on 100 parts by mass of the resin component of the hard coating composition. Such photopolymerization initiators may be used singly, or two or more photopolymerization initiators may be used in combination.

(Solvent)

The hard coating composition to be used in the present invention may contain a solvent. The solvent is not particularly limited, and can be appropriately selected in consideration of the components contained in the composition, the type of the substrate to be coated, the method of applying the composition, or the like. Specific examples of solvents that can be used include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole and phenetole; ester solvents such as ethyl acetate, butyl acetate, isopropyl acetate and ethylene glycol diacetate; amide solvents such as dimethylformamide, diethylformamide and N-methylpyrrolidone; Cellosolve solvents such as methyl cellosolve, ethyl cellosolve and butyl cellosolve; alcohol solvents such as methanol, ethanol and propanol; and halogen-containing solvents such as dichloromethane and chloroform. Such solvents may be used singly, or two or more species thereof may be used in combination. Of these solvents, ester solvents, ether solvents, alcohol solvents and ketone solvents are preferably used.

Various additives may be added to the hard coating composition of the present invention, if necessary. Such additives include common-use additives such as antistatic agents, plasticizers, surfactants, and antioxidants.

The hard coat layer provided using the hard coating composition is characterized by having high extensibility and high adhesion to a transparent polymer substrate in addition to the performance required for the hard coat layer such as high visibility and good hardness.

The hard coat layer is formed by applying the hard coating composition described above to a transparent polymer substrate. The method of applying the hard coating composition can be appropriately selected according to the hard coating composition and the situation of the coating step, and the hard coating composition can be applied, for example, by a clip coating method, an air knife coating method, a curtain coating method, a roller coating method, a wire bar coating method, a gravure coating method, or an extrusion coating method (U.S. Pat. No. 2,681,294).

The hard coat layer is formed by curing the coating film obtained by applying the hard coating composition. This curing can be carried out by irradiation with a light source that emits active energy rays with a required wavelength. For example, light having an integral of light of 500 to 1500 mJ can be used as the active energy rays for irradiation. While the wavelength of the irradiation light is not particularly limited, irradiation light having a wavelength of, for example, 360 nm or less can be used. Such light can be obtained by using a high-pressure mercury lamp, an extra-high pressure mercury lamp or the like.

In one embodiment, the hard coat layer is a cured layer of a hard coating composition containing a first component and a second component, and the hard coat layer has, on its side on which the protective layer is located, fine irregularities formed through phase separation between the first component and the second component. For example, the phase separation generated by the first component and the second component is preferably phase separation that can form fine irregularities having a surface roughness of 0.01 to 2.00 μm on a surface of the hard coat layer. When phase separation is generated at a surface roughness within such a range, no problem occurs with appearance and a hard coat layer having excellent mechanical strength is formed.

[Coating Composition for Forming Protective Layer]

The protective layer is a cured layer of a coating composition for forming a protective layer. The cured layer of the coating composition for forming a protective layer is, for example, a layer formed by applying the coating composition for forming a protective layer to the hard coat layer, and drying and curing the coating composition. The applying, drying and curing of the coating composition for forming a protective layer can be carried out by a method known in the art. The composition for forming the protective layer is not particularly limited as long as it does not impair the features of the present invention.

The protective layer is formed from, for example, a curable resin such as a thermosetting resin and a radiation-curable resin as a main constituent. In the present invention, from the viewpoint that excellent hardness can be obtained and excellent smoothness can be imparted as a protective layer, a radiation-curable resin is preferable, and especially, a UV-curable resin is preferable. The protective layer in the present invention is preferably composed of the following radiation-curable resin as a main constituent. Here, the phrase "as a main constituent" means that the content is 50% by mass or more, preferably 80% by mass or more based on the mass of the protective layer.

For example, the coating composition for forming a protective layer may contain the same components as those contained in the composition forming the hard coat layer. For example, a combination of a urethane acrylate such as a urethane acrylate oligomer and another acrylic resin such as an acrylic copolymer may be available.

It is noted that the compounding amount and the like are appropriately selected such that the physical properties of the protective layer such as extension rate and glass transition temperature are within the ranges of the present invention.

The following commercially available products can be used as the resin that can be contained in the coating composition for forming a protective layer: AF-300 (silicone acrylate resin produced by The Nippon Synthetic Chemical Industry Co., Ltd.), H-7M40 (urethane acrylate resin produced by Negami Chemical Industrial Co., Ltd.), UN-904M (urethane acrylate oligomer produced by Negami Chemical Industrial Co., Ltd.), CN-9893 (bifunctional urethane acrylate oligomer produced by Arkema), M-315 (acrylate resin produced by TOAGOSEI CO., LTD.), UN-332011 (urethane acrylate resin produced by Negami Chemical Industrial Co., Ltd.), M-402 (acrylate resin produced by TOAGOSEI CO., LTD.), and LINC-3A (acrylate resin produced by Kyoeisha Chemical Co., Ltd.).

(Photopolymerization Initiator)

As the photopolymerization initiator, the same type of initiator as that for the hard coat layer can be used. For example, IRGACURE-184D, IRGACURE-127, IRGACURE 907 Series produced by BASF, and the like may be used singly, or two or more species thereof may be used in combination.

(Solvent)

As the solvent, the same type of solvent as that for the hard coat layer can be used. For example, diacetone alcohol, propylene glycol monomethyl ether, methyl ethyl ketone, methyl isobutyl ketone, isopropyl alcohol, and the like may be used singly, or two or more species thereof may be used in combination.

The coating composition for forming a protective layer may optionally contain further additives. For example, a common surface modifier containing a silicone compound as a main constituent can be used. Especially, it is preferable to use a silicon compound modified with fluorine.

Examples of commercially available products of the silicone compound include BYK-UV 3500 and BYK-UV-3570 (both trade names; produced by BYK Japan KK), TEGO Rad 2100, 2200N, 2250, 2500, 2600, 2700 (all trade names; produced by Evonik Degussa Japan Co., Ltd.), X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174 DX, X-22-8201, X-22-2426, X-22-164A, X-22-164C (all trade names; produced by Shin-Etsu Chemical Co., Ltd.)

In order to improve the anti-fouling durability of the ultraviolet-curable resin layer formed by curing an ultraviolet curable resin composition containing an ultraviolet absorber, it is preferable that the ultraviolet curable resin composition contains a polymerizable fluorine compound having a fluorine atom and an ethylenically unsaturated group in one molecule (hereinafter abbreviated as "polymerizable fluorine compound").

As the polymerizable fluorine compound, commercially available ones can be used. Examples thereof include Biscoat Series (produced by Osaka Organic Chemical Industry Ltd.), SUA 1900 L Series (produced by Shin Nakamura Chemical Co., Ltd.), UT-3971 (produced by The Nippon Synthetic Chemical Industry Co., Ltd.), MEGAFAC RS Series and DEFENSA TF3000 Series (produced by DIC Corporation), LIGHT PROCOAT AFC3000 (produced by Kyoeisha Chemical Co., Ltd.), OPTOOL DAC-HP (produced by Daikin Industries, Ltd.), KSN5300 (produced by Shin-Etsu Chemical Co., Ltd.), and UVHC Series (produced by GE Toshiba Silicones Co., Ltd.).

The coating composition for forming a protective layer may contain hollow silica fine particles. The hollow silica fine particles play a role of lowering the refractive index of the protective layer while maintaining the layer strength of the layer. Such a hollow silica fine particle has a structure filled with a gas and/or a porous structure containing a gas. Furthermore, the hollow silica fine particles may be a silica fine particle whose refractive index decreases inversely proportional to the gas occupation rate as compared with the refractive index inherent to a silica fine particle. Silica fine particles capable of forming a nanoporous structure in at least a part of the inside and/or the surface are also included in the present invention, depending on the form, structure, aggregation state of the silica fine particles and dispersed state inside the coating film. For example, THRULYA 4320 (produced by JGC Catalysts and Chemicals Ltd.) may be used as the hollow silica fine particles.

The hollow silica fine particles have an average particle diameter of preferably 60 nm to 800 nm. The average particle diameter as referred to herein is a primary particle diameter. The primary particle diameter can be determined by photographing a particle transmission image using a transmission electron microscope and calculating the diameter based on the areas of individual particles obtained from image analysis.

The content of the hollow silica fine particles in the coating composition for forming a protective layer is 35 to 50 parts by mass, preferably 37.5 to 47.5 parts by mass, per 100 parts by mass of the total solid of the coating composition for forming a protective layer. By containing the hollow silica fine particles in such a range, the laminated film for molded decoration can have excellent anti-reflection characteristics.

[Transparent Polymer Substrate]

Examples of the transparent polymer substrate to be used in the present invention include substrates made of transparent polymers such as polycarbonate-based films, polyester-based films such as polyethylene terephthalate and polyethylene naphthalate; cellulose-based films such as diacetyl cellulose and triacetyl cellulose; and acrylic films such as polymethyl methacrylate. Examples of the transparent polymer substrate to be used in the present invention also include substrates made of transparent polymers such as styrene-based films such as polystyrene and acrylonitrile-styrene copolymer; olefin-based films such as polyvinyl chloride, polyethylene, polypropylene, polyolefin with a cyclic or norbornene structure, ethylene-propylene copolymer; and amide-based films such as nylon and aromatic polyamides.

Furthermore, examples of the transparent polymer substrate to be used in the present invention also include substrates made of transparent polymers such as polyimide, polysulfone, polyether sulfone, polyether ether ketone, polyphenylene sulfide, polyvinyl alcohol, polyvinylidene chloride, polyvinyl butyral, polyallylate, polyoxymethylene, epoxy resins, and blends of these polymers.

Further, the transparent polymer substrate may be a laminate of a plurality of substrates made of transparent polymers. For example, the transparent polymer substrate may be a laminate of a film made of an acrylic resin and a film made of a polycarbonate-based resin.

Among the transparent polymer substrates in the present invention, a substrate with low optical birefringence, a substrate with a phase difference controlled to ¼ of a wavelength (e.g., 550 nm), i.e., $\lambda/4$, or ½ of a wavelength, i.e., $\lambda/2$, or a substrate without controlling its birefringence can be selected in view of its use.

The thickness of the transparent polymer substrate may be determined as needed. In general, in view of strength and workability such as handleability, the thickness is about 10 to 500 µm, preferably 20 to 400 µm, and more preferably 30 to 350 µm.

[Other Layers]

The present invention further provides a decorated molding including the laminated film for molded decoration of the present invention.

In one embodiment, the decorated molding including the laminated film for molded decoration of the present invention is a decorated molding in which a decorative layer, a transparent polymer substrate, a hard coat layer and a protective layer are laminated in that order.

The decorative layer is a layer that decorates a laminated film for molded decoration with patterns, characters, metallic luster or the like. Examples of such a decorative layer include a printed layer or a vapor-deposited layer. Both the printed layer and the vapor-deposited layer are layers for decoration. In the present invention, either one of the printed layer and the vapor-deposited layer may be provided as the decorative layer, or both the printed layer and the vapor-deposited layer may be provided. The printed layer may be a layer composed of a plurality of layers. A printed layer is preferred.

The printed layer is a layer that decorates the surface of a molding with patterns and/or characters, or the like. Examples of the printed layer include patterns composed of woody textures, stone-like textures, cloth-like textures, sand-like textures, geometrical figures, characters, and whole solid. As the material for the printed layer, a colored ink may be used which contains resins such as polyvinyl-based resins including vinyl chloride/vinyl acetate-based copolymer resins, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins as a binder, and a pigment or dye with a suitable color as a coloring agent. As the pigment of the ink to be used for the printed layer, for example, the following can be used. Ordinarily, as the pigment, a yellow pigment such as an azo-based pigment such as polyazo, an organic pigment such as isoindolinone, or an inorganic pigment such as chrome yellow; a red pigment such as an azo-based pigment such as polyazo, an organic pigment such as quinacridone, or an inorganic pigment such as iron red; a blue pigment such as an organic pigment such as phthalocyanine blue or an inorganic pigment such as cobalt blue; a black pigment such as an organic pigment such as aniline black; and a white pigment such as an inorganic pigment such as titanium dioxide can be used.

As the dye of the ink to be used for the printed layer, various known dyes may be used to an extent not impairing the effect of the present invention. As the method of printing the ink, it is possible to use a known printing method such as offset printing, gravure printing, or screen printing, or a known coating method such as roll coating or spray coating. At that time, when a low molecular weight crosslinking compound is not used, but a photocurable resin composition with a constitution where the polymers are crosslinked together is used as in the present invention, there is no surface tackiness, there is little trouble at the time of printing, and the yield is good.

The vapor-deposited layer can be formed by vacuum vapor deposition method, sputtering method, ion plating method, plating method, or the like using at least one metal selected from the group of aluminum, nickel, gold, platinum, chromium, iron, copper, indium, tin, silver, titanium, lead, and zinc or an alloy or compound thereof.

The thickness of the printed layer or the vapor-deposited layer for decoration can be suitably selected by a method ordinarily used depending on the degree of extension at the time of molding such that a desired surface appearance of a molding is obtained.

The present invention further provides a decoration panel having the decorated molding of the present invention laminated on a displaying side of a touch panel or a display, in which the decorated molding is laminated with a substrate surface of the transparent polymer substrate located on a side opposite the hard coat layer being disposed on the displaying side of the touch panel or the display.

The present invention also provides a decoration panel having the decorated molding of the present invention laminated on a displaying side of a touch panel or a display, in which a decorative layer is disposed on a part of a substrate surface of the transparent polymer substrate located on a side opposite the hard coat layer, and the decorated molding is laminated with a substrate surface of the transparent polymer substrate located on a side opposite the hard coat layer being disposed on the displaying side of the touch panel or the display, wherein, the substrate surface of the transparent polymer substrate on which the decorative layer is not provided is disposed on the displaying side.

In the present invention, when a part of the displaying side of the display has a touch panel function, it may be simply described as a touch panel.

The laminated film for molded decoration, the decoration panel, and the like of the present invention can be used for resin moldings or metal moldings that constitute, for example, automotive components, personal digital assistants, household appliances, furniture, and in-home furnishing.

[Method for Producing Laminated Film for Molded Decoration]

The method for producing the laminated film for molded decoration of the present invention includes, for example, applying a hard coating composition to a transparent polymer substrate; drying and curing the hard coating composition applied to form a hard coat layer;
applying a coating composition for forming a protective layer to the hard coat layer on a side opposite the transparent polymer substrate; and drying and curing the coating composition applied to form a protective layer.

In one embodiment, the method for producing the laminated film for molded decoration of the present invention includes:
applying a hard coating composition containing a first component and a second component;
drying and curing the hard coating composition applied to form a hard coat layer;
forming, through phase separation between the first component and the second component in the drying step, fine irregularities on a surface of the hard coat layer on which the protective layer is to be laminated;
applying a coating composition for forming a protective layer to the surface of the hard coat layer on which the fine irregularities have been formed; and drying and curing the coating composition for forming a protective layer applied to form a protective layer.

By forming the coating layer and the protective layer in this way, the laminated film for molded decoration of the present invention can be made thinner in thickness as a whole, and furthermore, it is excellent in mechanical strength and has good transparency.

The conditions to be employed for applying and drying the hard coating composition and the coating composition for forming a protective layer may be those known in the art.

The details concerning the hard coating composition, the coating composition for forming a protective layer, and the like are as described above.

EXAMPLES

The present invention will be described more specifically with reference to the following examples, but the present invention is not limited to the examples. In the examples, "parts" and "%" are on a mass basis unless otherwise indicated.

[Preparation of Unsaturated Double Bond-Containing Acrylic Copolymer as Second Component]

A mixture consisting of 171.6 g of isoboronyl methacrylate, 2.6 g of methyl methacrylate and 9.2 g of methacrylic acid was obtained. This mixed solution was added dropwise to 330.0 g of methyl isobutyl ketone heated to 110° C. under a nitrogen atmosphere in a 1,000 ml reaction vessel equipped with a stirring blade, a nitrogen inlet tube, a condenser and a dropping funnel together with a solution of 80.0 g of propylene glycol monomethyl ether containing 1.8 g of tertiary butylperoxy-2-ethyl hexanoate at a constant rate over 3 hours, and then these were subjected to a reaction at 110° C. for 30 minutes. Then, a solution of 17.0 g of propylene glycol monomethyl ether containing 0.2 g of tertiary butylperoxy-2-ethyl hexanoate was added dropwise, and a solution of 5.0 g of propylene glycol monomethyl ether containing 1.4 g of tetrabutylammonium bromide and 0.1 g of hydroquinone was added, and a solution of 22.4 g of 4-hydroxybutyl acrylate glycidyl ether and 5.0 g of propylene glycol monomethyl ether was added dropwise over 2 hours with air bubbling, followed by further reacting them over 5 hours. An unsaturated double bond-containing acrylic copolymer having a number-average molecular weight of 5,500 and a weight-average molecular weight of 18,000 was obtained. This resin had an SP value of 10.0.

Hard Coating Composition Preparation Examples 1 to 11

Hard coating composition preparation examples 1 to 11 were prepared by mixing the components shown in Table 1 below in the amounts shown in Table 1 below.

In hard coating composition preparation examples 9 and 10, an acrylate monomer or oligomer was used as the first component and the unsaturated double bond-containing acrylic copolymer prepared above was used as the second component.

In hard coating composition preparation example 9, the SP value of the first component was 12.1 and the SP value of the second component was 10.0.

In hard coating composition preparation example 10, the SP value of the first component was 12.1 and the SP value of the second component was 10.0.

[Coating Composition for Forming Protective Layer Preparation Examples 1 to 6]

Coating composition for forming protective layer preparation examples 1 to 6 were prepared by mixing the components shown in Table 2 below in the amounts shown in Table 2 below.

[Conditions for Preparation of Laminated Film for Molded Decoration]

On a transparent polymer substrate having a thickness of 300 μm (Iupilon DF02U produced by Mitsubishi Gas Chemical Company, Inc.; a film provided with an acrylic resin layer on a polycarbonate layer), a hard coating composition prepared in a prescribed formulation corresponding to individual Examples and Comparative Examples was applied with a bar coater such that a prescribed thickness would be achieved, followed by drying at 80° C. for 1 minute, and then the composition was subjected to irradiation with ultraviolet rays at an integral of light of 200 mJ, thereby preparing a hard coat layer.

To the hard coat layer on a side opposite the transparent polymer substrate, a coating composition for forming a protective layer prepared in a prescribed formulation corresponding to individual Examples and Comparative Examples was applied with a bar coater such that a prescribed thickness would be achieved, followed by drying at 80° C. for 1 minute, and then the composition was subjected to irradiation with ultraviolet rays at an integral of light of 200 mJ under a nitrogen atmosphere, and thus obtained was a laminated film for molded decoration in which the transparent polymer substrate, the hard coat layer, and the protective layer were laminated in that order.

The detailed contents of the hard coating composition used for forming the hard coat layer are shown in Table 1. In the table, "NV" means a nonvolatile content (% by mass).

TABLE 1

| | | NV | Manufacturer | Preparation Example 1 | Preparation Example 2 | Preparation Example 3 | Preparation Example 4 | Preparation Example 5 | Preparation Example 6 | Preparation Example 7 | Preparation Example 8 | Preparation Example 9 | Preparation Example 10 | Preparation Example 11 |
|---|---|---|---|---|---|---|---|---|---|---|---|---|---|---|
| | | | | Hard coating composition | | | | | | | | | | |
| | Irgacure 184D | 100 | BASF | 4.00 | 4.00 | 4.00 | 4.00 | 4.00 | | | 5.00 | 4.00 | 4.00 | 4.00 |
| | Irgacure 127 | 100 | BASF | 1.00 | 1.00 | 1.00 | 1.00 | 1.00 | | | | 1.00 | 1.00 | 1.00 |
| Acrylate monomer or oligomer | CN-9893 | 100 | Arkema | 75.00 | 56.25 | 56.25 | 100.00 | | | | | | | 75.00 |
| | M-315 | 100 | Toagosei | 25.00 | 18.75 | 18.75 | | 100.00 | | | | 10.00 | 10.00 | 25.00 |
| | M-240 | 100 | Toagosei | | | | | | | | | 5.00 | 5.00 | |
| | M-402 | 100 | Toagosei | | | | | | | | | 20.00 | 20.00 | |
| | UX-8101 | 100 | Nippon Kayaku | | | | | | | | | | | |
| | UN-904M | 80 | Negami Chemical Industrial | | 15.63 | | | | | | | 25.00 | 25.00 | |
| | H-7M40 | 60 | Negami Chemical Industrial | | 20.83 | | | | | | | 66.67 | 66.67 | |
| | Aronix M-106 | 100 | Toagosei | | | 6.25 | | | | | | | | |
| | GX-8781F | 65 | DKS | | | 19.23 | | | | | | | | |
| | R-1403MB | 70 | Hitachi Chemical | | | 8.93 | | | | | | | | |
| | BEAMSET 1200 | 60 | Arakawa Chemical Industries | | | | | | 166.67 | | | | | |
| | KAYANOVA FOP-1740 | 82 | Nippon Kayaku | | | | | | | 121.95 | | | | |
| | UA-5201 | 100 | Shin Nakamura Chemical | | | | | | | | 100.00 | | | |
| | Unsaturated double bond-containing acrylic copolymer as second component | 30 | | | | | | | | | | 20.00 | 33.33 | |
| | MX-300 Crosslinked acrylic particles with a particle diameter of 3 μm | 100 | Soken Chemical & Engineering | | | | | | | | | | | 5.00 |

Acrylate monomer or oligomer descriptions:
- CN-9893: Urethane acrylate oligomer
- M-315: Isocyanuric acid EO-modified di- and tri-acrylate
- M-240: Polyethylene glycol (n ≈ 4) diacrylate
- M-402: Dipentaerythritol penta- and hexa-acrylate
- UX-8101: Urethane (meth) acrylate
- UN-904M: Urethane acrylate oligomer
- H-7M40: Urethane acrylate oligomer
- Aronix M-106: o-Phenylphenol EO-modified (n ≈ 1) acrylate
- GX-8781F: Polyfunctional urethane acrylate
- R-1403MB: Acrylate group-containing urethane acrylate oligomer
- BEAMSET 1200: Epoxy acrylate
- KAYANOVA FOP-1740: Polyester acrylate
- UA-5201: Urethane acrylate TABLE 1-continued

| | NV | Manufacturer | Preparation Example 1 | Preparation Example 2 | Preparation Example 3 | Preparation Example 4 | Preparation Example 5 | Preparation Example 6 | Preparation Example 7 | Preparation Example 8 | Preparation Example 9 | Preparation Example 10 | Preparation Example 11 |
|---|---|---|---|---|---|---|---|---|---|---|---|---|---|
| Hard coating composition | | | | | | | | | | | | | |
| TINUVIN 460 UV absorber | | BASF | | | | | | 2.40 | 2.40 | | | | |
| Methyl ethyl ketone | | | 73.13 | 61.67 | 63.72 | 73.13 | 73.13 | 123.50 | 168.22 | 220.00 | 160.48 | 158.57 | 76.61 |
| Isopropyl alcohol | | | 25.35 | 25.35 | 25.35 | 25.35 | 25.35 | | | | | | 26.56 |
| Ethyl acetate | | | 3.90 | 3.90 | 3.90 | 3.90 | 3.90 | | | | | | 4.09 |
| Methyl isobutyl ketone | | | 92.63 | 92.63 | 92.63 | 92.63 | 92.63 | | | | | | 97.04 |
| Toluene | | | | | | | | | | | | | |
| Total | | | 300.00 | 300.00 | 300.00 | 300.00 | 300.00 | 292.57 | 292.57 | 325.00 | 317.14 | 328.57 | 314.29 |
| Solid content | | | 105.00 | 105.00 | 105.00 | 105.00 | 105.00 | 102.40 | 102.40 | 105.00 | 111.00 | 115.00 | 110.00 |
| Solid concentration | | | 35.00 | 35.00 | 35.00 | 35.00 | 35.00 | 35.00 | 35.00 | 32.31 | 35.00 | 35.00 | 35.00 |

The detailed contents of the coating composition for forming a protective layer used for forming the protective layer are shown in Table 2. In the table, "NV" means a nonvolatile content (% by mass).

TABLE 2

| | | NV | Manufacturer | Preparation Example 1 | Preparation Example 2 | Preparation Example 3 | Preparation Example 4 | Preparation Example 5 | Preparation Example 6 |
|---|---|---|---|---|---|---|---|---|---|
| Coating composition for forming protective layer | | | | | | | | | |
| Irgacure 184D | | 100 | BASF | | | | | | |
| Irgacure 127 | | 100 | BASF | 7.00 | 7.00 | 7.00 | 7.00 | 7.00 | |
| Irgacure 907 | | 100 | BASF | | | | | | 3.00 |
| AF-300 | Silicon-modified polyfunctional acrylate | 50 | The Nippon Synthetic Chemical Industry | 100.00 | | | 100.00 | | |
| H-7M40 | Urethane acrylate oligomer | 60 | Negami Chemical Industrial | 83.33 | 41.67 | | 83.33 | | |
| UN-904M | Urethane acrylate oligomer | 80 | Negami Chemical Industrial | | 31.25 | | | | |
| CN-9893 | Acrylate oligomer | 100 | Arkema | | 37.50 | | | | |
| M-315 | Isocyanuric acid EO-modified di- and tri-acrylate | 100 | Toagosei | | 12.50 | | | | |
| UN-3320HS | Urethane acrylate resin | 95 | Negami Chemical Industrial | | | 52.63 | | | |
| M-402 | Dipentaerythritol penta- and hexa-acrylate | 100 | Toagosei | | | | | 100.00 | 43.00 |
| LINC-3A | Acrylate resin | 100 | Kyoeisha Chemical | | | 50.00 | | | |
| X-22-2457 | Acrylate group-containing silicone compound | 100 | Shin-Etsu Chemical | | | | | | 4.00 |
| OPTOOL DAC-HP | Fluorine-containing UV-curable antifouling additive | 20 | Daikin Industries | 30.00 | 30.00 | 30.00 | 30.00 | | |
| THRULYA 4320 | Hollow silica fine particles, average particle diameter: 60 nm | 20.5 | JGC Catalysts and Chemicals | 446.21 | 446.21 | 137.80 | 0.00 | | 243.90 |
| Diacetone alcohol | | | | 2719.49 | 2719.49 | 1878.63 | 1502.90 | 1423.10 | |
| Propylene glycol monomethyl ether | | | | 703.43 | 763.84 | 668.94 | 536.77 | 609.90 | |
| Methyl ethyl ketone | | | | | | | | | 1077.78 |
| Methyl isobutyl ketone | | | | | | | | | 883.88 |
| Isopropyl alcohol | | | | | | | | | 1077.78 |
| Total | | | | 4089.46 | 4089.46 | 2825.00 | 2260.00 | 2140.00 | 3333.33 |
| Solid content | | | | 204.47 | 204.47 | 141.25 | 113.00 | 107.00 | 100.00 |
| Solid concentration | | | | 5.00 | 5.00 | 5.00 | 5.00 | 5.00 | 3.00 |
| Hollow silica content (wt %) | | | | 44.74 | 44.74 | 20.00 | 0.00 | 0.00 | 50.00 |

Examples 1 to 11

Using the individual compositions described in Tables 1 and 2, a hard coat layer and a protective layer were prepared in accordance with the methods described above, and thus laminated films for molded decoration were prepared. The physical properties and the like of the resulting laminated film for molded decoration were evaluated in accordance with the methods described later. The details of the results obtained and the like are shown in Table 3.

Since the laminated films for molded decoration obtained in Examples 6 and 7 are embodiments not intending to exhibit the anti-reflective performance effect by adjusting the refractive index of each layer, the anti-reflective performance is not evaluated.

TABLE 3

|  |  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Constitution Single film characteristics | Protective layer | Preparation Example | 1 | 1 | 1 | 2 | 3 | 4 | 5 | 6 | 1 | 1 | 1 |
|  |  | Coating thickness (μm) | 0.1 | 0.1 | 0.1 | 0.1 | 0.1 | 0.1 | 0.1 | 0.1 | 0.1 | 0.1 | 0.1 |
|  |  | Indentation hardness | 1140 | 1140 | 1140 | 422 | 285 | 305 | 565 | 853 | 1140 | 1140 | 1140 |
|  |  | Extension rate (%) | 5-10 | 5-10 | 5-10 | 15-20 | 5-10 | 5-10 | 0-5 | 0-5 | 5-10 | 5-10 | 5-10 |
|  |  | Tg | 130 | 130 | 130 | 112 | 124 | 132 | >200 | >200 | 130 | 130 | 130 |
|  |  | Refractive index | 1.38 | 1.38 | 1.38 | 1.38 | 1.40 | 1.51 | 1.52 | 1.38 | 1.38 | 1.38 | 1.38 |
|  | HC layer | Preparation Example | 1 | 2 | 3 | 1 | 1 | 1 | 1 | 1 | 9 | 10 | 11 |
|  |  | Coating thickness (μm) | 3 | 3 | 3 | 3 | 3 | 3 | 3 | 3 | 3 | 3 | 3 |
|  |  | Indentation hardness | 127 | 177 | 169 | 127 | 127 | 127 | 127 | 127 | 185 | 185 | 138 |
|  |  | Extension rate (%) | 60-65 | 30-35 | 50-55 | 60-65 | 60-65 | 60-65 | 60-65 | 60-65 | 25-30 | 25-30 | 25-30 |
|  |  | Tg | 68 | 91 | 74 | 68 | 68 | 68 | 68 | 68 | 98 | 102 | 70 |
|  |  | Refractive index | 1.50 | 1.51 | 1.53 | 1.50 | 1.50 | 1.50 | 1.50 | 1.50 | 1.51 | 1.51 | 1.50 |
| Laminated film Characteristic value | Pencil hardness |  | H | 2H | H | H | H | H | H | H | 2H | 2H | H |
|  | Scratch resistance |  | ⊙ | ⊙ | ⊙ | ○ | ○ | ○ | ○ | ⊙ | ⊙ | ⊙ | ⊙ |
|  | Extension rate (%) |  | ○ 35-40 | ○ 25-30 | ○ 35-40 | ⊙ 55-60 | ⊙ 50-55 | ○ 40-45 | ○ 25-30 | ○ 25-30 | ○ 20-25 | ○ 20-25 | ○ 30-35 |
|  | Change in hue by molding |  | ○ | ○ | ○ | ○ | ○ | ○ | ○ | ○ | ○ | ○ | ○ |
|  | Fingerprint resistance |  | ○ | ○ | ○ | ○ | ○ | ○ | ⊙ | ○ | ⊙ | ⊙ | ⊙ |
|  | Water contact angle |  | 106 | 106 | 106 | 103 | 108 | 106 | 72 | 105 | 106 | 106 | 107 |
|  | Oleic acid contact angle |  | 72 | 72 | 72 | 71 | 71 | 72 | <5 | 72 | 72 | 72 | 72 |
|  | Surface roughness |  | 0 | 0 | 0 | 0 | 0 | 0 | 0 | 0 | 0.04 | 0.41 | 0.12 |
|  | Anti-reflection characteristics |  | ⊙ | ⊙ | ⊙ | ⊙ | ⊙ | — | — | ⊙ | ○ | ○ | ○ |

Comparative Examples 1 to 10

Using the individual compositions described in Tables 1 and 2, a hard coat layer and a protective layer were prepared in accordance with the methods described above, and thus laminated films for molded decoration were prepared. The physical properties and the like of the resulting laminated film for molded decoration were evaluated in accordance with the methods described later. The details of the results obtained and the like are shown in Table 4.

TABLE 4

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Constitution Single film characteristics | Protective layer | Preparation Example | 6 | 6 | None | 1 | 1 | 1 | 1 | 1 | 1 | 1 |
|  |  | Coating thickness (μm) | 0.1 | 0.1 | None | 3 | 0.1 | 0.1 | 0.1 | 0.1 | 0.1 | 0.1 |
|  |  | Indentation hardness | 853 | 853 | None | 1140 | 1140 | 1140 | 1140 | 1140 | 1140 | 1140 |
|  |  | Extension rate (%) | 0-5 | 0-5 | None | 5-10 | 5-10 | 5-10 | 5-10 | 5-10 | 5-10 | 5-10 |
|  |  | Tg | >200 | >200 | None | 130 | 130 | 130 | 130 | 130 | 130 | 130 |
|  |  | Refractive index | 1.38 | 1.38 | None | 1.38 | 1.38 | 1.38 | 1.38 | 1.38 | 1.38 | 1.38 |
|  | HC layer | Preparation Example | 6 | 7 | 8 | 1 | 1 | 4 | 5 | 6 | 7 | 8 |
|  |  | Coating thickness (μm) | 3 | 3 | 5 | 3 | 20 | 3 | 3 | 3 | 3 | 3 |
|  |  | Indentation hardness | 351 | 417 | 60 | 127 | 127 | 43 | 386 | 351 | 417 | 60 |
|  |  | Extension rate (%) | 5-10 | 0-5 | 75-80 | 60-65 | 60-65 | 75-80 | 5-10 | 5-10 | 0-5 | 75-80 |
|  |  | Tg | 160 | 160 | 65 | 68 | 68 | 60 | 165 | 160 | 165 | 65 |
|  |  | Refractive index | 1.51 | 1.51 | 1.51 | 1.50 | 1.50 | 1.50 | 1.51 | 1.51 | 1.51 | 1.51 |

TABLE 4-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Laminated film Characteristic value | Pencil hardness | 2H | 2H | <F | 2H | 2H | <F | 2H | 2H | 2H | <F |
|  | Scratch resistance | ⊙ | ⊙ | x | ⊙ | ○ | Δ | ⊙ | ⊙ | ⊙ | Δ |
|  | Extension rate (%) | x | x | ⊙ | x | Δ | ○ | x | x | x | ⊙ |
|  |  | 0-5 | 0-5 | 75-80 | 0-5 | 10-15 | 55-60 | 5-10 | 0-5 | 0-5 | 55-60 |
|  | Change in hue by molding | Crack | Crack | ○ | Crack | ○ | ○ | Crack | Crack | Crack | ○ |
|  | Fingerprint resistance | ○ | ○ | ○ | ○ | ○ | ○ | ○ | ○ | ○ | ○ |
|  | Water contact angle | 102 | 102 | 74 | 109 | 106 | 106 | 106 | 106 | 106 | 106 |
|  | Oleic acid contact angle | 70 | 71 | <5 | 71 | 71 | 71 | 71 | 71 | 71 | 71 |
|  | Surface roughness | 0 | 0 | 0 | 0 | 0 | 0 | 0 | 0 | 0 | 0 |
|  | Anti-reflection characteristics | ○ | ○ | x | x | ○ | ○ | ○ | ○ | ○ | ○ |

[Evaluation of Physical Properties of Hard Coat Layer]

The test methods for evaluating the physical properties of a hard coat layer and the methods for the evaluation of the results obtained are described below.

Indentation Hardness:
(Method of Sample Preparation)

Approximately 0.5 ml of the hard coating composition prepared in the above formulation was dropped onto a micro slide glass (S2215, produced by Matsunami Glass Ind., Ltd.) using a spuit and was dried in a hot air drying furnace at 80° C. for 5 minutes. Then, the dried composition was cured at an integral of light of 1,000 mJ by using an ultraviolet irradiation machine, thereby obtaining a hard coat layer having a thickness of 2 to 10 µm.

(Evaluation Method)

The resulting cured film was subjected to measurement for a stress value at an indentation of 0.1 µm by using a micro hardness tester H100CS manufactured by Fischer, and then the indentation hardness of the cured film was measured.

Extension Rate:
(Method of Sample Preparation)

The hard coating composition prepared in the above formulation was applied onto COSMOSHINE A4300 (polyester-based film (PET film), thickness: 100 µm) produced by Toyobo Co., Ltd. by using a bar coater and was dried in a hot air drying furnace at 80° C. for 5 minutes. Then, the composition was cured by using an ultraviolet irradiation machine at an integral of light of 1000 mJ, thereby preparing a hard coat layer having a thickness of 2 to 4 µm.

The resulting hard coat layer was cut into a strip form of 200 mm×10 mm, thereby obtaining a test piece.

The resulting hard coat layer was placed in an autograph with a distance between chucks being set to 150 mm. The hard coat layer was stretched in stages by 7.5 mm (5%) at a condition of 300 mm/min under a 100° C. nitrogen atmosphere, discoloration and cracks were checked visually, and an extension rate was calculated from a distance between chucks at the time when discoloration or cracks were generated.

For example, when no cracks are generated but the stretch length between chucks is 67.5 mm in the case of discoloration generation, and the stretch length between chucks is 75 mm in the case of crack generation, calculation is carried as follows:

$$\text{extension rate (lower limit)} = (67.5 \text{ mm}/150 \text{ mm}) \times 100 = 45\%$$

$$\text{extension rate (upper limit)} = (75 \text{ mm}/150 \text{ mm}) \times 100 = 50\%, \text{ and}$$

the extension rate is described as 45 to 50%.

Refractive Index:
(Method of Sample Preparation)

The hard coating composition prepared in the above formulation was applied onto COSMOSHINE A4300 (polyester-based film (PET film), thickness: 100 µm) produced by Toyobo Co., Ltd. by using a bar coater and was dried in a hot air drying furnace at 80° C. for 5 minutes. Then, the composition was cured by using an ultraviolet irradiation machine at an integral of light of 1000 mJ, thereby preparing a hard coat layer having a thickness of 2 to 4 µm.

(Evaluation Method)

For the resulting hard coat layer, the refractive index was measured using an Abbe refractometer 2T manufactured by ATAGO CO., LTD.

Glass Transition Temperature (Tg):
(Method of Sample Preparation)

Approximately 0.5 ml of the hard coating composition prepared in the above formulation was dropped onto a micro slide glass (S2215, produced by Matsunami Glass Ind., Ltd.) using a spuit and was dried in a hot air drying furnace at 80° C. for 5 minutes. Then, the dried composition was cured at an integral of light of 1,000 mJ by using an ultraviolet irradiation machine, thereby obtaining a hard coat layer having a thickness of 5 to 10 µm.

The cured film was scraped off with a scalpel, thereby preparing a test sample.

(Evaluation Method)

A glass transition point (glass transition temperature) was measured under a temperature elevation condition of 5° C./min by using X-DSC 7000 manufactured by SII Nano-Technology Inc.

[Evaluation of Physical Properties of Protective Layer]

The test methods for evaluating the physical properties of a protective layer and the methods for the evaluation of the results obtained are described below.

Indentation Hardness:
(Method of Sample Preparation)

Approximately 1 ml of the coating composition for forming a protective layer prepared in the above-mentioned formulation was dropped onto a micro slide glass (S2215, produced by Matsunami Glass Ind., Ltd.) using a spuit and was dried in a hot air drying furnace at 80° C. for 5 minutes. Then, the dried composition was cured at an integral of light of 1,000 mJ by using an ultraviolet irradiation machine, thereby obtaining a protective cured film for evaluation having a thickness of 2 to 10 μm depending on an evaluation method.

(Evaluation Method)

The resulting cured film was subjected to measurement for a stress value at an indentation of 0.1 μm by using a micro hardness tester H100CS manufactured by Fischer, and then the indentation hardness of the cured film was measured.

With respect to the thickness (5 to 10 μm) of the protective cured film for evaluation, the thickness of the protective layer (50 to 200 nm) in the present invention is excessively thin and the hardness inherent to the protective layer could not be effectively measured. For this reason, a protective cured film for evaluation having a thickness of 5 to 10 μm was separately prepared in order to evaluate the physical properties of the protective layer formed from the composition for forming a protective layer.

Extension Rate:
(Method of Sample Preparation)

The coating composition for forming a protective layer prepared in the above formulation was applied onto COSMOSHINE A4300 (polyester-based film (PET film), thickness: 100 μm) produced by Toyobo Co., Ltd. by using a bar coater and was dried in a hot air drying furnace at 80° C. for 5 minutes. Then, the composition was cured by using an ultraviolet irradiation machine at an integral of light of 1000 mJ, thereby preparing a cured film having a thickness of 2 to 4 μm.

The resulting cured film was cut into a strip form of 200 mm×10 mm, thereby obtaining a test piece.

(Evaluation Method)

The resulting cured film was placed in an autograph with a distance between chucks being set to 150 mm. The cured film was stretched in stages by 7.5 mm (5%) at a condition of 300 mm/min under a 100° C. nitrogen atmosphere, discoloration and cracks were checked visually, and an extension rate was calculated from a distance between chucks at the time when discoloration or cracks were generated.

For example, when no cracks are generated but the stretch length between chucks is 67.5 mm in the case of discoloration generation, and the stretch length between chucks is 75 mm in the case of crack generation, calculation is carried as follows:

extension rate (lower limit)=(67.5 mm/150 mm)×100=45% extension rate (upper limit)=(75 mm/150 mm)×100=50%, and the extension rate is described as 45 to 50%.

Refractive Index:
(Method of Sample Preparation)

The coating composition for forming a protective layer prepared in the above formulation was applied onto COSMOSHINE A4300 (polyester-based film (PET film), thickness: 100 μm) produced by Toyobo Co., Ltd. by using a bar coater and was dried in a hot air drying furnace at 80° C. for 5 minutes. Then, the composition was cured by using an ultraviolet irradiation machine at an integral of light of 1000 mJ, thereby preparing a cured film having a thickness of 0.1 μm.

(Evaluation Method)

For the resulting cured film, the refractive index was measured using an Abbe refractometer 2T manufactured by ATAGO CO., LTD.

Glass Transition Temperature (Tg):
(Method of Sample Preparation)

Approximately 1 ml of the coating composition for forming a protective layer prepared in the above formulation was dropped onto a micro slide glass (S2215, produced by Matsunami Glass Ind., Ltd.) using a spuit and was dried in a hot air drying furnace at 80° C. for 5 minutes. Then, the dried composition was cured at an integral of light of 1,000 mJ by using an ultraviolet irradiation machine, thereby obtaining a cured film having a thickness of 5 to 10 μm. The cured film was scraped off with a scalpel, thereby preparing a test sample.

(Evaluation Method)

A glass transition point (glass transition temperature) was measured under a temperature elevation condition of 5° C./min by using X-DSC 7000 manufactured by SII Nano-Technology Inc.

[Evaluation of Physical Properties of Laminated Film for Molded Decoration]

The test methods for evaluating the physical properties of a laminated film for molded decoration and the methods for the evaluation of the results obtained are described below.

Pencil Hardness:

Measurement was carried out in accordance with JIS K5600.

Specifically, the measurement was carried out by using a pencil scratch applied-film hardness tester (manufactured by Toyo Seiki Seisaku-sho, Ltd., model P, pressing load: 100 g to 1 kg).

Using a pencil for pencil scratch test (inspected by Japan Paint Inspection and testing Association) produced by Mitsubishi Uni, the tip of the core thereof was adjusted with abrasive paper (3M P-1000) such that the tip would have a smooth circular section. After setting a sample on a measuring table, the pencil was fixed to have a scratch angle of 45°, and a test was conducted under a load of 750 g. For each test, the test was repeated five times with the test site shifted while smoothing the core.

The presence or absence of recesses on the surface of a coating film was checked visually based on the following evaluation criteria.

For example, in a test using a 2H pencil, when there was no generation of recesses, it was judged as 2H.

When the number of the recesses generated was 1 or 2, the evaluation was then conducted with the hardness of the pencil lowered by one step, and when the lowering by one step resulted in no generation of recesses, the hardness was evaluated as being in an intermediate range (H to 2H, or the like).

When three or more recesses were generated, the hardness was judged to be less than or equal to H, and the evaluation was carried out in the same manner by lowering by one step.

The pencil hardness preferably has 2H to H. When the pencil hardness is less than F, the hardness and the scratch resistance can be judged as being poor.

Scratch Resistance:

Rubbing was conducted 200 times at a rate of 30 times per minute with a load of 2 N per 4 cm$^2$ of a surface of a laminated film for molded decoration among 100 mm on a test piece.

The surface of the sample after the scratch test was observed with a microscope with a magnification of 100 times (Digital Microscope VHX-2000, lens: Z2100, manufactured by KEYENCE CORPORATION) and was judged in the field of view of the microscope based on the following criteria. The results of the microscopic observations in Examples 1 and 4 and Comparative Examples 3, 6 and 10 are shown in FIG. 1.

⊙ Scratches having a length of 500 μm or more are not visually recognized at all.

○ One or two scratches having a length of 500 μm or more were visually recognized.

Δ At least three scratches having a length of 500 μm or more were visually recognized.

x Many scratches having a length of 500 μm or more were visually recognized.

Extension Rate:

The resulting test sample was cut into a strip form of 200 mm×10 mm and was placed in an autograph with a distance between chucks being set to 150 mm. The resulting test sample was stretched in stages by 7.5 mm (5%) at a condition of 300 mm/min under a 100° C. nitrogen atmosphere, discoloration and cracks were checked visually, and an extension rate was calculated from a distance between chucks at the time when discoloration or cracks were generated.

For example, when no cracks are generated but the stretch length between chucks is 67.5 mm in the case of discoloration generation, and the stretch length between chucks is 75 mm in the case of crack generation, calculation is carried as follows:

extension rate (lower limit)=(67.5 mm/150 mm)×100=45% extension rate (upper limit)=(75 mm/150 mm)×100=50%, and the extension rate is described as 45 to 50%.

Change in Hue on Molding:

Using a vacuum pressure forming machine (manufactured by Fu-se Vacuum Forming Ltd.), the resulting laminated film for molded decoration was stretched by 30 to 40%. Using a color difference meter CR-300 (manufactured by Konica Minolta, Inc.), the color difference (ΔE) before and after stretching was judged according to the following criteria. The "cracks" described in Comparative Examples means that the film was cracked and was not able to be evaluated.

○: ΔE is less than 2.

Δ: ΔE is 2 or more and less than 4.

x: ΔE exceeds 4.

Fingerprint resistance: An imitated fingerprint solution was applied according to the following procedure.

(Coating Method)

Prepared was a cloth soaked with an oleic acid solution (ethanol solution containing 20% oleic acid) serving as a fingerprint resistance evaluation solution. A silicone rubber stopper No. 4 was covered on its bottom end face (16 mm in diameter) with a nonwoven fabric towel (BEMCOT M-1 produced by Asahi Chemical Industry Co., Ltd.). The part of the towel covering the end face of the silicone rubber stopper was pushed against the cloth soaked with oleic acid (stamp ink pad) and allowed to stand for 2 seconds with a load of 1 Kg, thereby impregnating the towel with oleic acid.

Subsequently, the rubber stopper was put on a test piece, applied with a load of 1 kg and allowed to stand for 1 second, thereby making the imitated fingerprint solution (oleic acid) attach to the test piece.

(Evaluation Method)

The imitated fingerprint solution attached to the test piece was wiped off in accordance with the following procedure and the fingerprint resistance was judged according to the criteria described below.

Wiping Method

Four sheets of BEMCOT M-1 (produced by Asahi Kasei Corporation) were stacked and attached to a jig.

Subsequently, a glass plate was attached to the stage of a scratch tester (STH-100 manufactured by CEPRO) and a test piece was set thereon.

Next, wiping was carried out under a load of 200 g/cm$^2$ and at a rate of 60 mm/sec The number of times of wiping was counted at the time when the wiping of the imitated fingerprint solution was judged to be completed by visual evaluation, and evaluation was conducted according to the following criteria.

⊙: Wiping is completed at 3 times or less.

○: Wiping is completed at 6 times or less.

Δ: Wiping is completed at 10 times or less.

Contact Angle:

Using an automatic contact angle meter (FM 40, manufactured by KRUSS), contact angles for the following two chemicals were measured.

Water; ion exchanged water

Oleic Acid; First Grade Oleic Acid

Measurement was carried out by forming droplets (2 μl) of a coating composition for forming a protective layer into the form of a coating film, measuring 30 seconds, 60 seconds, and 90 seconds after the preparation, calculating a linear regression equation of time t and θt by the least squares method, and determining the profile value θ0 at the time 0″ (immediately after) as the contact angle value of the coating film.

Surface Roughness:

A surface was observed with a magnification of 1000 times using a laser microscope (KEYENCE CORPORATION: VK-8700), and the surface roughness Ra (μm) was measured Evaluation of Anti-Reflection Characteristics:

A laminated film for molded decoration was laminated on a black PMMA plate (COMOGLAS(registered trademark), produced by Kuraray Co., Ltd., thickness: 2 mm) using OCA (optical adhesive sheet, PD-S1 produced by PANAC CO., LTD.).

A reflectance (R) at 380 nm to 780 nm was measured using U-4100 manufactured by Hitachi High-Technologies Corporation, and was judged according to the following criteria.

⊙: R≤2%

○: 2%<R≤4%

Δ: 4%<R≤6% x: 6%<R

The laminated films for molded decoration of the present invention were all confirmed to have high scratch resistance and sufficient extensibility.

Comparative Examples 1 and 2 are examples in which the extension rates of the laminated films for molded decoration are less than 15%. In these cases, generation of cracks was confirmed during molding.

Comparative Example 3 is an example in which no protective layer in the present invention is provided. In this case, it was confirmed that the hardness was low and the scratch resistance was poor.

Comparative Example 4 is an example in which the thickness of the protective layer exceeds 200 nm. In this case, the extension rate of the laminated film for molded decoration was less than 15%, and generation of cracks was confirmed during molding.

Comparative Example 5 is an example in which the thickness of the hard coat layer exceeds 10 μm. In this case, the extension rate of the laminated film for molded decoration is within the range of 10 to 15%, that is, less than 15%, and there is a problem that the film cannot be molded into a satisfactory three-dimensional shape.

Comparative Examples 6 and 10 are examples in which the laminated films for molded decoration are poor in scratch resistance.

Comparative Examples 7 to 9 are examples in which the laminated films for molded decoration are poor in extension rate, and in these cases, generation of cracks was confirmed during molding.

The laminated film for decoration of the present invention is a film prepared from a pre-cure type composition. The laminated film further has a moderate hardness, high scratch resistance and can maintain excellent visibility even in long-term use. Moreover, since the laminated film for decoration of the present invention has sufficient extensibility, cracks are not generated on the surface of the laminated film for decoration and the film can be easily molded into various shapes. In addition, when the laminated film for decoration of the present invention is used for, for example, a console panel as an automotive interior material, it can prevent external light from being reflected and irregularly reflected on the surface of the laminated film for decoration. Further, it also can prevent glare of light on the surface of the laminated film for decoration and can prevent decrease in transparency (screen looks white).

INDUSTRIAL APPLICABILITY

The laminated film for molded decoration of the present invention has high hardness and scratch resistance, an excellent long-term visibility-ensuring property, and excellent decorativeness. Furthermore, the laminated film for molded decoration of the present invention can follow deformation without generating cracks during molding processing and can be easily molded.

The invention claimed is:

1. A laminated film for molded decoration comprising a transparent polymer substrate; a hard coat layer having a thickness of 2 to 10 μm; and a protective layer having a thickness of 50 to 200 nm laminated in that order, wherein
the hard coat layer is a cured layer of a hard coating composition,
the protective layer is a cured layer of a coating composition for forming a protective layer,
the laminated film for molded decoration has an extension rate within a range of 15 to 80%, and
after a scratch test involving 200 reciprocations under a load of 2 N per 4 cm$^2$ of a surface of the laminated film for molded decoration, the laminated film for molded decoration has no scratches and no deterioration in visibility due to change in appearance, and
wherein
(1) the protective layer has an extension rate within a range of 0.01 to 20% when having a thickness of 2 to 4 μm and has a glass transition temperature of 100° C. or more,
(2) the hard coat layer has an extension rate within a range of 15 to 80% when having a thickness of 2 to 4 μm and a glass transition temperature of 60 to 105° C., and
(3) the transparent polymer substrate has a glass transition temperature of 60 to 160° C., and
the laminated film for molded decoration satisfies the following relationships:
the extension rate of the protective layer (1)<the extension rate of the hard coat layer (2), and
the glass transition temperature of the protective layer (1)>the glass transition temperature of the transparent polymer substrate (3)>the glass transition temperature of the hard coat layer (2).

2. The laminated film for molded decoration according to claim 1, wherein the protective layer has a refractive index of 1.38 to 1.50.

3. The laminated film for molded decoration according to claim 1, wherein the protective layer has a water contact angle of 100° or more and the protective layer has an oleic acid contact angle of 70° or more.

4. The laminated film for molded decoration according to claim 1, wherein the protective layer has a water contact angle of 65 to 80° and the protective layer has an oleic acid contact angle of less than 5°.

5. The laminated film for molded decoration according to claim 1, wherein the hard coat layer has a refractive index of 1.50 to 1.57.

6. The laminated film for molded decoration according to claim 1, wherein the hard coat layer is a cured layer of a hard coating composition containing a polyfunctional (meth)acrylate compound and a polyfunctional urethane acrylate.

7. The laminated film for molded decoration according to claim 1, wherein
the hard coat layer is a cured layer of a hard coating composition containing a first component and a second component,
the hard coat layer has, on a side on which the protective layer is located, fine irregularities formed through phase separation between the first component and the second component, and
the hard coat layer has a surface roughness of 0.01 to 2.00 μm on the surface having the fine irregularities.

8. The laminated film for molded decoration according to claim 7, wherein the first component contains a polyfunctional (meth)acrylate compound and a polyfunctional urethane acrylate, and the second component is an unsaturated double bond-containing acrylic copolymer.

9. The laminated film for molded decoration according to claim 1, wherein
the coating composition for forming a protective layer is a composition that affords an indentation hardness of 250 to 2000 N/mm$^2$ as measured with a micro hardness meter at an indentation of 0.1 μm when a cured film having a thickness of 5 to 10 μm is formed on a glass plate,
the hard coating composition is a composition that affords an indentation hardness of 100 to 400 N/mm$^2$ as measured with a micro hardness meter at an indentation of 0.1 μm when a hard coat layer having a thickness of 2 to 10 μm is formed on a glass plate, and the laminated film for molded decoration satisfies a relationship of (the indentation hardness based on the coating composition for forming a protective layer)> (the indentation hardness based on the hard coating composition).

10. The laminated film for molded decoration according to claim 1, wherein the transparent polymer substrate is a laminate of an acrylic polymer and polycarbonate.

11. A decorated molding comprising the laminated film for molded decoration according to claim 1.

12. A decoration panel having the decorated molding according to claim 11 laminated on a displaying side of a touch panel or a display, wherein the decorated molding is laminated with a substrate surface of the transparent polymer substrate located on a side opposite the hard coat layer being disposed on the displaying side of the touch panel or the display.

13. A decoration panel having the decorated molding according to claim 12 laminated on a displaying side of a touch panel or a display, wherein a decorative layer is disposed on a part of a substrate surface of the transparent polymer substrate located on a side opposite the hard coat layer, and the decorated molding is laminated with a substrate surface of the transparent polymer substrate located on a side opposite the hard coat layer being disposed on the displaying side of the touch panel or the display, wherein, the substrate surface of the transparent polymer substrate on which the decorative layer is not provided is disposed on the displaying side.

14. A decorated molding comprising the laminated film for molded decoration according to claim 1, wherein a decorative layer, the transparent polymer substrate, the hard coat layer, and the protective layer are laminated in that order.

15. A method for producing the laminated film for molded decoration according to claim 1, the method comprising:

applying a hard coating composition containing a first component and a second component to the transparent polymer substrate;

drying and curing the hard coating composition applied to form a hard coat layer;

forming, through phase separation between the first component and the second component in the drying step, fine irregularities on a surface of the hard coat layer on which the protective layer is to be laminated;

applying a coating composition for forming a protective layer to the surface of the hard coat layer on which the fine irregularities have been formed; and drying and curing the coating composition for forming a protective layer applied to form a protective layer.

16. The method for producing the laminated film for molded decoration according to claim 15, wherein the first component is urethane acrylate and the second component is an acrylic copolymer.

* * * * *